United States Patent
Feroz et al.

(10) Patent No.: US 9,489,519 B2
(45) Date of Patent: Nov. 8, 2016

(54) METHOD AND APPARATUS FOR ENCRYPTING DATA MESSAGES AFTER DETECTING INFECTED VM

(71) Applicant: Nicira, Inc., Palo Alto, CA (US)

(72) Inventors: Azeem Feroz, San Jose, CA (US); Kiran Kumar Thota, Bakersfield, CA (US); James C. Wiese, Dublin, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 14/320,579

(22) Filed: Jun. 30, 2014

(65) Prior Publication Data

US 2015/0379279 A1    Dec. 31, 2015

Related U.S. Application Data

(60) Provisional application No. 62/019,402, filed on Jun. 30, 2014.

(51) Int. Cl.
*H04L 29/00* (2006.01)
*G06F 21/60* (2013.01)
(Continued)

(52) U.S. Cl.
CPC ......... *G06F 21/602* (2013.01); *G06F 9/45558* (2013.01); *G06F 9/542* (2013.01);
(Continued)

(58) Field of Classification Search
USPC ................................................ 713/189, 193
See application file for complete search history.

(56) References Cited

U.S. PATENT DOCUMENTS

| | | | |
|---|---|---|---|
| 7,818,452 B2 | 10/2010 | Matthews et al. | |
| 7,948,986 B1 | 5/2011 | Ghosh et al. | |

(Continued)

FOREIGN PATENT DOCUMENTS

| | | |
|---|---|---|
| EP | 0887981 | 12/1998 |
| WO | WO 2008/095010 | 8/2008 |
| WO | PCT/US2014/072886 | 12/2014 |

OTHER PUBLICATIONS

Invitation to Pay Additonal Fees of PCT/US2014/072886, Sep. 2, 2015 (mailing date), Nicira, Inc.

(Continued)

*Primary Examiner* — Brandon Hoffman
*Assistant Examiner* — Michael D Anderson
(74) *Attorney, Agent, or Firm* — Adeli LLP

(57) ABSTRACT

For a host that executes one or more guest virtual machines (GVMs), some embodiments provide a novel encryption method for encrypting the data messages sent by the GVMs. The method initially receives a data message to send for a GVM executing on the host. The method then determines whether it should encrypt the data message based on a set of one or more encryption rules. When the process determines that it should encrypt the received data message, it encrypts the data message and forwards the encrypted data message to its destination; otherwise, the method just forwards the received data message unencrypted to its destination. In some embodiments, the host encrypts differently the data messages for different GVMs that execute on the host. When two different GVMs are part of two different logical overlay networks that are implemented on common network fabric, the method in some embodiments encrypts the data messages exchanged between the GVMs of one logical network differently than the data messages exchanged between the GVMs of another logical network. In some embodiments, the method can also encrypt different types of data messages from the same GVM differently. Also, in some embodiments, the method can dynamically enforce encryption rules in response to dynamically detected events, such as malware infections.

24 Claims, 26 Drawing Sheets

(51) Int. Cl.
  *G06F 9/455* (2006.01)
  *G06F 21/56* (2013.01)
  *G06F 9/54* (2006.01)
  *H04L 9/14* (2006.01)
  *H04L 29/06* (2006.01)
  *G09C 1/00* (2006.01)

(52) U.S. Cl.
  CPC ............ *G06F 21/56* (2013.01); *G06F 21/568* (2013.01); *G09C 1/00* (2013.01); *H04L 9/14* (2013.01); *H04L 63/0428* (2013.01); *H04L 63/123* (2013.01); *H04L 63/1408* (2013.01); *H04L 63/1441* (2013.01); *G06F 2009/45587* (2013.01); *G06F 2221/034* (2013.01); *H04L 2209/24* (2013.01)

(56) References Cited

U.S. PATENT DOCUMENTS

| | | | |
|---|---|---|---|
| 8,190,767 | B1 | 5/2012 | Maufer et al. |
| 8,364,983 | B2* | 1/2013 | Rangegowda et al. ....... 713/193 |
| 8,601,583 | B1* | 12/2013 | Chandrasekhar ....... G06F 21/54 726/24 |
| 2003/0093481 | A1 | 5/2003 | Mitchell et al. |
| 2007/0061492 | A1 | 3/2007 | van Riel |
| 2008/0072305 | A1 | 3/2008 | Casado et al. |
| 2008/0244569 | A1 | 10/2008 | Challener et al. |
| 2009/0129271 | A1 | 5/2009 | Ramankutty et al. |
| 2009/0235325 | A1 | 9/2009 | Dimitrakos et al. |
| 2010/0031353 | A1* | 2/2010 | Thomas et al. ................. 726/22 |
| 2010/0153701 | A1 | 6/2010 | Shenoy et al. |
| 2013/0073743 | A1 | 3/2013 | Ramasamy et al. |
| 2013/0163594 | A1 | 6/2013 | Sharma et al. |
| 2013/0227303 | A1 | 8/2013 | Kadatch et al. |
| 2013/0227550 | A1 | 8/2013 | Weinstein et al. |
| 2013/0332983 | A1 | 12/2013 | Koorevaar et al. |
| 2014/0068602 | A1 | 3/2014 | Gember et al. |
| 2014/0115578 | A1 | 4/2014 | Cooper et al. |

OTHER PUBLICATIONS

U.S. Appl. No. 14/320,573, filed Jun. 30, 2014, Thota, Kiran Kumar, et al.
U.S. Appl. No. 14/320,576, filed Jun. 30, 2014, Thota, Kiran Kumar, et al.
U.S. Appl. No. 14/320,578, filed Jun. 30, 2014, Thota, Kiran Kumar, et al.
U.S. Appl. No. 14/320,581, filed Jun. 30, 2014, Thota, Kiran Kumar, et al.
U.S. Appl. No. 14/320,582, filed Jun. 30, 3014, Feroz, Azeem, et al.
U.S. Appl. No. 14/320,584, filed Jun. 30, 2014, Thota, Kiran Kumar, et al.
Portions of prosecution history of U.S. Appl. No. 14/320,582, Aug. 12, 2015, Feroz, Azeem, et al.
Author Unknown, "Enabling Service Chaining on Cisco Nexus 1000V Series," Month Unknown, 2012, 25 pages, Cisco.
Casado, Martin, et al., "SANE: A Protection Architecture for Enterprise Networks," Proceedings of the 15$^{th}$ USENIX Security Symposium, Jul. 31, 2006, pp. 137-151.
Guichard, J., et al., "Network Service Chaining Problem Statement," Network Working Group, Jun. 13, 2013, 14 pages, Cisco Systems, Inc.
Joseph, Dilip Antony, et al., "A Policy-aware Switching Layer for Date Centers," Jun. 24, 2008, 26 pages, Electrical Engineering and Computer Sciences, University of California, Berkeley, CA, USA.
Kent, S., "IP Encapsulating Security Payload (ESP)," Dec. 2005, pp. 1-44, The Internet Society.
Popa, Lucian, et al., "Building Extensible Networks with Rule-Based Forwarding," In USENIX OSDI, Month Unknown, 2010, pp. 1-14.
Sekar, Vyas, et al., "Design and Implementation of a Consolidated Middlebox Architecture," 9$^{th}$ USENIX conference on Networked System Design and Implementation, Apr. 25-27, 2012, 14 pages.
Sherry. Justine, et al., "Making Middleboxes Someone Else's Problem: Network Processing as a Cloud Service," SSIGCOMM, Aug. 13-17, 2012, 12 pages, ACM, Helsinki, Finland.

* cited by examiner

METHOD AND APPARATUS FOR ENCRYPTING DATA MESSAGES AFTER DETECTING INFECTED VM

BACKGROUND

Enterprises (e.g., financial service providers, healthcare providers, critical infrastructure providers, etc.) store valuable data, and transfer it over networks. Information spreads across datacenters often through dedicated telco-provided networks. Overlay networks provide the same service across the wide area network (WAN) on a public network for enterprises, and are susceptible to threats such as snooping, man in the middle attack (MITM), and forging. As enterprises widely adopt cloud-based Software-Defined Data Center (SDDC) instead of dedicated datacenters, new challenges are introduced, and protecting the data flowing into, within, and out of the cloud becomes a necessity. The privacy guarantee of private datacenters is no longer assumed, and threats similar to those in the Internet prevail.

Cryptography protects data and communication channels from malicious parties, provides confidentiality to enterprise dataflow in the cloud, and provides control over the data to the enterprise. However, current approaches to encrypt network data fall short in terms of contextual information, isolation, granularity, or ease of management. For example, IPSec has been a key game changer in business to business (B2B), virtual private networks (VPNs), and branch-office networking. However, IPSec tunneling by the edge devices is oblivious to the application context and the user generating the network traffic, lacks granularity as it encrypts data in bulk, and cannot address various internal threats as the traffic between the virtual machines (VMs) and the edge devices is in plaintext. Moreover, the known problem with traditional IPSec is that both endpoints negotiate a security association, and agree upon a key. In a network that includes N endpoints, the number of keys in the secure overlay is $O(N^2)$.

In-VM encryption provides contextual information for fine-grained security decisions. However, in-guest encryption fails to isolate the protected data from the protection mechanism as they both reside in the guest. This scheme also suffers from inability for upgrades, and is extremely difficult to manage from a centralized management console.

BRIEF SUMMARY

For a host that executes one or more guest virtual machines (GVMs), some embodiments provide a novel encryption method for encrypting the data messages sent by the GVMs. The method initially receives a data message to send for a GVM executing on the host. The method then determines whether it should encrypt the data message based on a set of one or more encryption rules. When the process determines that it should encrypt the received data message, it encrypts the data message and forwards the encrypted data message to its destination; otherwise, the method just forwards the received data message unencrypted to its destination.

By employing this method, a host frees up the GVMs from the encryption tasks, while flexibly encrypting different GVM data messages differently. For instance, in some embodiments, the host encrypts differently the data messages for different GVMs that execute on the host (e.g., encrypts the data messages from one GVM while not encrypting the data messages for another GVM). When two different GVMs are part of two different logical overlay networks that are implemented on a common network fabric, the method in some embodiments encrypts the data messages exchanged between the GVMs of one logical network differently than the data messages exchanged between the GVMs of another logical network.

In some embodiments, the method can also encrypt different types of data messages from the same GVM differently. For example, by examining the destination identifiers (e.g., destination MAC addresses, destination IP addresses, etc.) in the header fields of the data messages, the host can encrypt the data messages from a particular GVM to one destination (e.g., a first destination GVM) differently than the data messages from the particular GVM to another destination (e.g., a second destination GVM). By examining the header field values (e.g., the higher-level L4 attributes), the host can even differently encrypt different data messages that are part of different data flows between one pair of GVMs.

The method of some embodiments can dynamically create and enforce encryption rules in response to dynamically detected events. For instance, in some embodiments, the GVMs running on the host are scanned for malware periodically or continuously. When malware is detected on a GVM, the GVM is tagged as an infected GVM. In response to such a tag, the host uses the encryption method of some embodiments to encrypt the data messages sent by the infected GVM, or to encrypt the data messages sent by the other GVMs on the same host as the infected GVM. In some embodiments, the encryption method also dynamically adds and enforces encryption rules after detecting different flow-based events.

When the method encrypts a received GVM data message, the encrypted message has to be decrypted by a corresponding method at the destination of the GVM data message. In some embodiments, the encryption and decryption operations of these two methods are statically synchronized as they are configured beforehand to use the appropriate encryption/decryption keys for different data messages. For example, when two GVMs on two different hosts operate as part of one logical network, one or more controllers and/or key managers in some embodiments provide the same cryptographic key(s) (e.g., one identical key, or a pair of associated keys that are transformed versions of each other) to both hosts, such that each host uses the provided key(s) to encrypt all GVM data messages at their source and to decrypt all data messages at their destination. In some of these embodiments, the controllers and/or key managers periodically refresh the keys that the hosts store for their prospective encryption and decryption operations.

In other embodiments, however, the encryption methodology is more dynamic. For instance, in some embodiments, a host's encryption method initially detects a condition (e.g., a malware event or a flow-based event) that requires data messages from one or more of the host's GVMs to be encrypted. Upon detecting the condition, the host's method identifies an encryption key, uses the encryption key to encrypt some or all of the data message (e.g., the payload and some or all of the message header), and then includes a key identifier (i.e., the key ID) in the data message (e.g., in the message header or in another header that is used to encapsulate the message header) so that the data message's destination (e.g., the destination host) can know which key to use to decrypt the encrypted message.

The dynamic encryption methodology of some embodiments is a hypervisor-based encryption scheme that uses guest introspection (GI) to get application-centric and contextual metadata about network traffic, in order to dynamically apply attribute-based security policies on the GVM traffic, and encrypt this GVM traffic accordingly. In some embodiments, the hypervisor is a software layer (e.g., an application) over which the GVMs execute. The hypervisor in some embodiments implements the above-described encryption and decryption methods.

In some embodiments, the hypervisor also uses guest introspection to obtain application-centric and contextual information about the applications that each GVM runs. To perform guest introspection, the hypervisor in some embodiments communicates with a thin introspecting agent that is deployed on each GVM. The thin introspecting agent has a network introspection module that in some embodiments is called by the TCP/IP stack each time the stack processes a new connection request. Through these calls, the network introspection module captures (1) every new connection request (e.g., both incoming and outgoing connection requests) and (2) contextual information (e.g., user identity and application context) for the new connections. In some embodiments, the thin introspecting agent includes other introspection modules that gather other introspection data. For example, in some embodiments, the agent includes file and system introspection modules that are used to scan the thin agent's GVM for malware.

The above-described hypervisor-based encryption scheme combines the best of in-guest encryption and network-based encryption. It avoids the overhead of key management of N-to-N GVMs, and it performs encryption based on fine-grained, context aware policies. As such, it provides context-aware, hypervisor-based network encryption that dynamically enforces fine-grained encryption policies, while bridging the gap between having sufficient context to perform context-aware encryption and maintaining isolation between the encryption and the GVM operations.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a host computing device (the "host") that executes one or more guest virtual machines (GVMs), some embodiments provide a novel encryption method for encrypting the data messages sent by the GVMs. Examples of GVMs include webservers, application servers, database servers, etc. In some cases, all the GVMs belong to one entity, e.g., an enterprise that operates a datacenter with multiple hosts. In other cases, the host executes in a multi-tenant environment (e.g., in a multi-tenant data center), and different groups of GVMs belong to different tenants. As used in this document, encryption refers to the encoding of "plaintext" data (i.e., unencrypted data) into a "ciphertext" format by using an encryption algorithm (also called encryption operator or process) that takes as input, the plaintext data and an encryption key. Decryption refers to the conversion of the encrypted ciphertext data into plaintext data by applying a decryption algorithm (also called decryption operator or process), which relies on a decryption key, on the encrypted ciphertext data.

Figure 1:
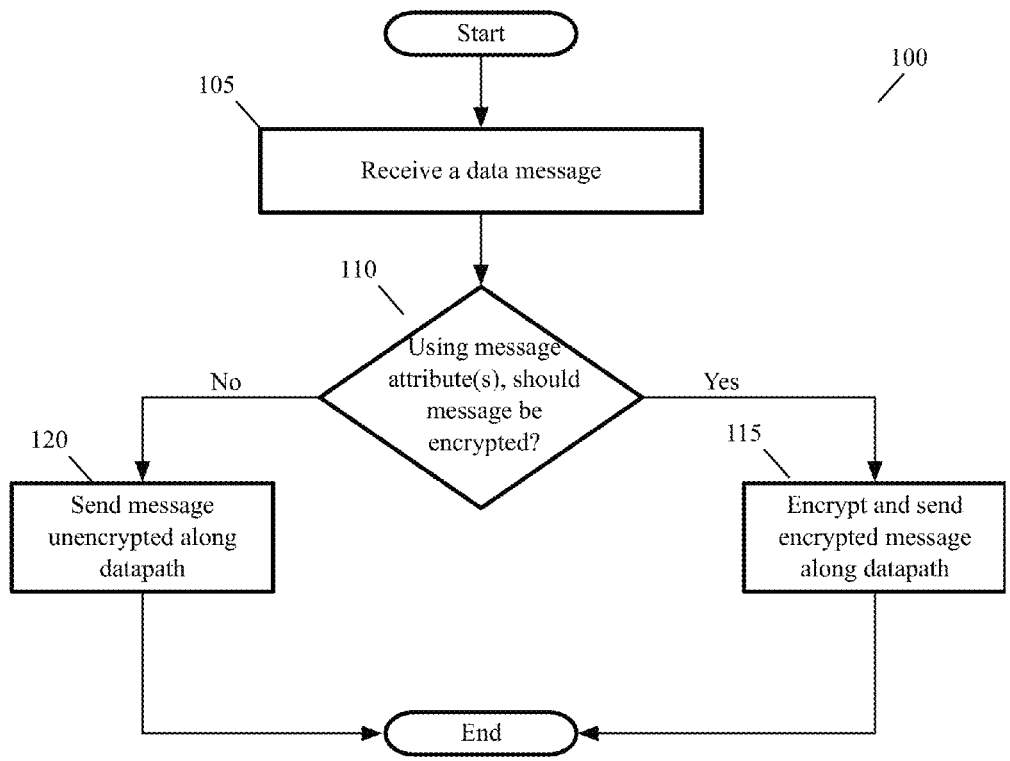
FIG. 1 illustrates an encryption process for encrypting the data messages sent by the GVMs.

FIG. 1 illustrates a process 100 that implements the novel encryption method of some embodiments of the invention. This process 100 intercepts a data message from a GVM along the message's datapath, encrypts this message if necessary, and then sends the encrypted or unencrypted message out along its datapath. As used herein, data messages refers to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc.

Figure 2:
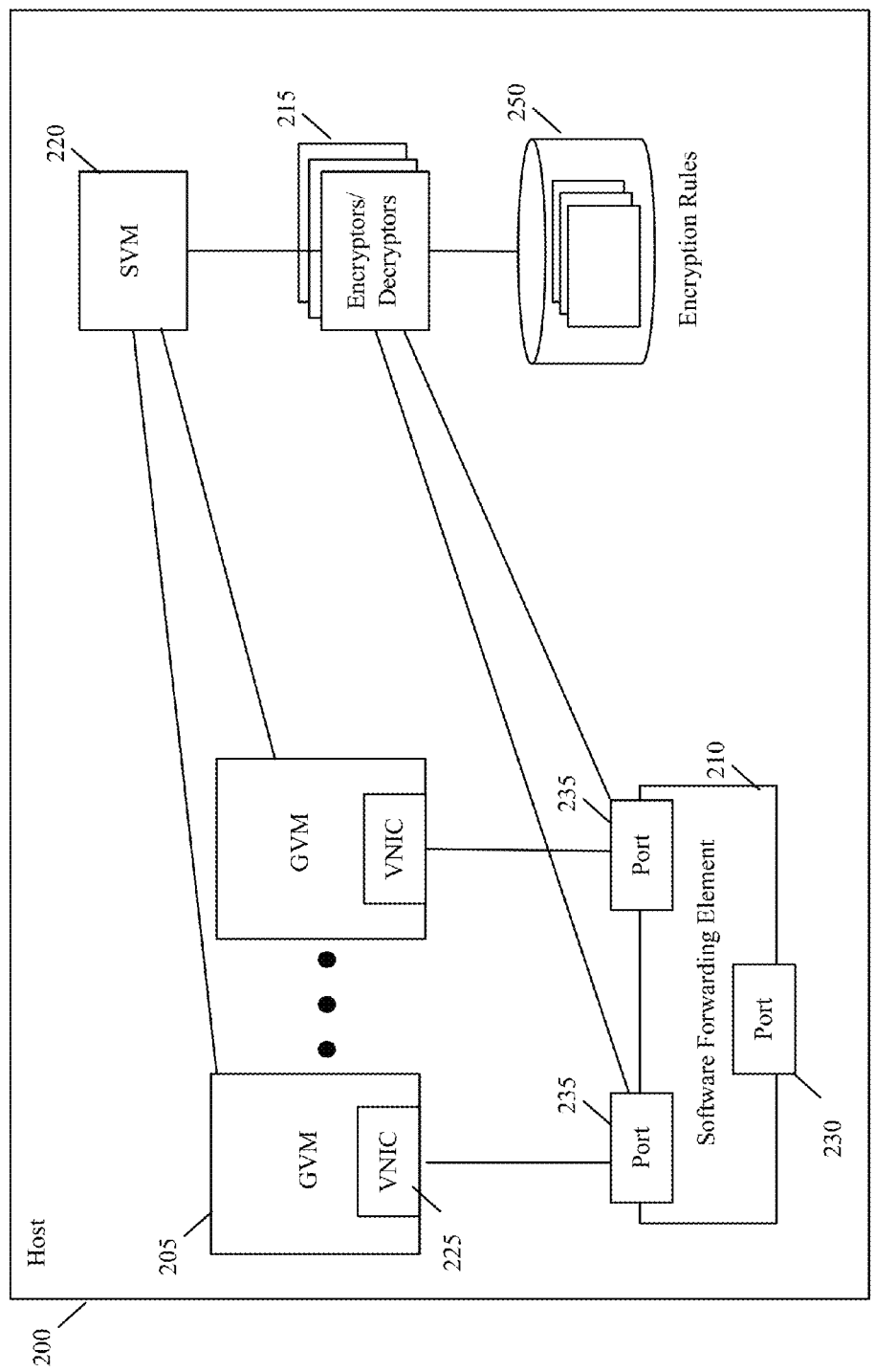
FIG. 2 illustrates a host encryption architecture of some embodiments.

In some embodiments, the process 100 of FIG. 1 is performed by the host on which the GVMs execute. This process 100 will be described below by reference to FIG. 2, which illustrates one architecture for a host 200 to intercept and encrypt outgoing GVM data messages, and to intercept and decrypt incoming GVM data messages. Specifically, FIG. 2 illustrates a host 200 that executes multiple GVMs 205, a software forwarding element 210, a set of one or more encryptors/decryptors 215 (referred to as the "encryptor set"), and a malware-detecting SVM 220.

The software forwarding element (SFE) 210 executes on the host to communicatively couple the GVMs of the host to each other and to other devices (e.g., other GVMs) outside of the host. As shown, the SFE 210 includes a port 230 to connect to a physical network interface card (NIC) of the host, and a port 235 to connect to the virtual NIC (VNIC) 225 of each GVM. In some embodiments, the VNICs are software abstractions of the physical NIC (PNIC) that are implemented by the virtualization software (e.g., by a hypervisor). Each VNIC is responsible for exchanging packets between its GVM and the SFE 210 through its corresponding SFE port. As shown, a GVM's egress datapath for its data messages includes (1) the GVM's VNIC 225, (2) the SFE port 235 that connects to this VNIC, (3) the SFE 210, and (4) the SFE port 230 that connects to the host's PNIC.

Through its port 230 and a NIC driver (not shown), the SFE 210 connects to the host's PNIC to send outgoing packets and to receive incoming packets. The SFE 210 performs message-processing operations to forward messages that it receives on one of its ports to another one of its ports. For example, in some embodiments, the SFE tries to use header values in the GVM data message to match the message to flow based rules, and upon finding a match, to perform the action specified by the matching rule (e.g., to hand the packet to one of its ports 230 or 235, which directs the packet to be supplied to a destination GVM or to the PNIC). In some embodiments, the SFE 210 is a software switch, while in other embodiments it is a software router or a combined software switch/router.

The SFE 210 in some embodiments implements one or more logical forwarding elements (e.g., logical switches or logical routers) with SFEs executing on other hosts in a multi-host environment. A logical forwarding element in some embodiments can span multiple hosts to connect GVMs that execute on different hosts but belong to one logical network. In other words, different logical forwarding elements can be defined to specify different logical networks for different users, and each logical forwarding element can be defined by multiple SFEs on multiple hosts. Each logical forwarding element isolates the traffic of the GVMs of one logical network from the GVMs of another logical network that is serviced by another logical forwarding element. A logical forwarding element can connect GVMs executing on the same host and/or different hosts.

In the host architecture illustrated in FIG. 2, the process 100 is performed by the SFE ports 235 and the encryptor(s) 215. The ports 235 in some embodiments include one or more function calls to one or more modules that implement special input/output (I/O) operations on incoming and outgoing packets that are received at the ports. One of these function calls for a port is to an encryptor/decryptor in the encryptor/decryptor set 215. As further described below, the encryptor/decryptor performs the encryption/decryption rule check and the encryption/decryption operations on outgoing/incoming data messages (i.e., on messages that are sent by one of the GVMs and/or that are received by the host for one of the GVMs). In some embodiments, each port 235 has its own encryptor/decryptor 215, while in other embodiments, some or all of the ports 235 share the same encryptor/decryptor 215 (e.g., all the ports share one encryptor/decryptor, or all ports that are part of the same logical network share one encryptor/decryptor).

Examples of other I/O operations that are implemented by the ports 235 include message encapsulation operations needed for sending messages along tunnels to implement overlay logical network operations. By implementing a stack of such function calls, the ports can implement a chain of I/O operations on incoming and/or outgoing messages in some embodiments. Instead of calling the I/O operators (including the encryptor set 215) from the ports 235, other embodiments call these operators from the GVM's VNIC or from the port 230 of the SFE. For instance, as further described below, the port 230 in some embodiments calls a decryptor when it receives an encrypted GVM message from outside of its host and the GVM message has its L2 payload and L2 header values encrypted. The port 230 in some embodiments calls the decryptor 215 to decrypt this L2 encrypted message so that it can obtain the L2 header value that the SFE 210 needs to identify the port 235 to which it needs to pass the GVM data message.

As shown in FIG. 1, the process 100 initially receives (at 105) a data message to send from a GVM executing on the host. The process 100 then determines (at 110) whether it should encrypt the data message based on a set of one or more encryption rules. In FIG. 2, this determination in some embodiments is made (at 110) by (1) a port 235 relaying to its encryptor 215 the GVM data message that the port 235 receives from the VNIC 225 of the GVM that sent the message, and (2) the encryptor 215 using the GVM message's attributes to examine encryption rules that are stored in an encryption rule data store 250 of the host. In some embodiments, the port 235 relays the GVM message by passing to the encryptor 215 a reference (e.g., a handle that identifies a location in memory that stores the GVM message) to the GVM message.

The GVM message attributes that the encryptor/decryptor uses in some embodiments to check the encryption/decryption rules include the message header values. For instance, the encryptor in some embodiments determines whether it should encrypt a GVM data message by using the data message's header values (e.g., its L2-L4 attributes) to identify an encryption rule that is applicable to the GVM data message. For an L2 frame, the header values include the source and destination MAC addresses, while for an L3/L4 packet, the header values are the five tuple identifiers, which include the packet's source identifier, destination identifier, source port, destination port, and protocol (service). Also, in some embodiments, one or more of the identifier values can be logical values that are defined for a logical network (e.g., can be virtual network identifier (VNI) for a VXLAN overlay network, or a logical IP addresses defined in a logical address space). In other embodiments, all of the identifier values are defined in the physical domains. In still other embodiments, some of the identifier values are defined in logical domain, while other identifier values are defined in the physical domain.

To determine (at 110) whether the GVM data message should be encrypted, the encryptor 215 uses the GVM message attributes to examine the encryption rules stored in the encryption rule data store 250, in order to determine whether this data store 250 contains a rule that identifies an encryption key for encrypting the received GVM data message. Similarly, to decrypt at least some of the encrypted data messages, a decryptor 215 in some embodiments uses the message attributes of these encrypted data messages to search the encryption rules stored in the encryption rule data store 250 to identify a rule that identifies a key for decrypting the received GVM data message. In some embodiments, the decryptor 215 identifies a key for decrypting a received encrypted GVM data message by using a key identifier that is inserted in the GVM data message by the encryptor of this message or by another module at the direction of this encryptor. The processes for decrypting encrypted messages will be further described below.

When the encryptor 215 determines (at 110) that it should encrypt the GVM data message, it (at 115) retrieves the GVM data message from memory (e.g., at a location provided by the SFE port or GVM VNIC that called the encryptor), encrypts the data message and passes the encrypted data message back to the SFE port 235 that called it. The SFE port 235 then sends the encrypted data message along the message's datapath.

When the encryptor 215 determines (at 110) that it should not encrypt the GVM data message, it directs (at 120) the module that called it to pass the GVM data message unencrypted along its datapath. In the example illustrated in FIG. 2, this operation entails informing the SFE port 235 to pass the GVM data message to the SFE 210 so that the SFE can process the GVM data message to forward the message to its intended destination. After 115 or 120, the process 100 ends.

By employing the process 100, the host 200 frees up the GVMs from the encryption tasks, while flexibly encrypting the GVM data messages based on any number of encryption rules in the encryption rule data store 250. For instance, based on these rules, the host 200 can encrypt differently the data messages for different GVMs that execute on it. One example of different encryption involves encrypting the data messages from one GVM while not encrypting the data messages for another GVM. Other examples of different encryption include encrypting different portions of the GVM messages (e.g., encrypting just the L2 payload, encrypting the L2 header and payload, etc.), using different encryption algorithms (e.g., using AES128GCM encryption versus using AES256GCM encryption, or using AES-GCM encryption versus using AES-CBC/SHA1-HMAC encryption, or using AES encryption versus using 3DES encryption), using different encryption keys, etc. Also, as further described below, some embodiments not only encrypt the payload of the GVM message, but also (1) perform integrity check value (ICV) calculations on the GVM message payload and some or all of the unencrypted header values (e.g., L3/L4 header values, or logical network identifier values), and then (2) encrypt the hash value that results from the ICV calculation along with the payload. After decrypting the payload along with the ICV-generated hash, the destination host can then authenticate the GVM data message by authenticating the hash value for the GVM data message's header value and payload. The encryption of the payload and the ICV-generated hash will be further described below.

When two different GVMs are part of two different logical overlay networks that are implemented on common network fabric (e.g., on a common set of host SFEs and one or more intermediate forwarding elements), the process 100 in some embodiments encrypts the data messages exchanged between the GVMs of one logical network differently than the data messages exchanged between the GVMs of another logical network.

In some embodiments, the process can also encrypt different types of data messages from the same GVM differently. For example, by examining the destination identifiers (e.g., destination MAC addresses, destination IP addresses, etc.) in the header fields of the data messages, the host can encrypt the data messages from a particular GVM to one destination (e.g., a first destination GVM) differently than the data messages from the particular GVM to another destination (e.g., a second destination GVM). By examining the header field values (e.g., the higher-level L4 attributes), the host can even encrypt differently different data messages from one GVM to another GVM that are part of different data flows.

In some embodiments, the malware-detecting SVM 220 of the host scans the GVMs of the host for malware periodically or continuously. Malware is malicious software used to disrupt computer operations, gather sensitive information, and/or gain access to computer systems. Malware can appear in the form of executable code, scripts, active content, and other software. Examples of malware include viruses, spyware, worms, adware, Trojan horses, and other malicious programs When the SVM detects malware on a GVM, the SVM 220 tags the GVM as an infected GVM. In response to such a tag, the host uses the encryption process of some embodiments to encrypt the data messages sent by the infected GVM, or to encrypt the data messages sent by the other GVMs on the same host as the infected GVM, or both. As further described below, the host 200 performs this encryption by (1) defining an encryption rule for this event, (2) using encryption policies that it stores to convert the security tag to a set of L2-L4 parameters that specify matching attributes for the encryption rule, and (3) pushing this rule into the encryption rule data store 250. This dynamically created rule in some embodiments requires the encryptor or another module to include a key identifier with the encrypted GVM data message, so that the destination host can know what key to use to decrypt the encrypted GVM data message.

The creation of an encryption rule in response malware-related event is one example of how the encryption architecture of some embodiments can dynamically create and enforce encryption rules in response to a detected event. In some embodiments, the encryption architecture can also dynamically add encryption rules to the encryption rule data store after detecting different flow-based events. The dynamic addition of such encryption rules will be further described by reference to FIG. 4, which presents a more detailed encryption architecture of some embodiments.

Figure 3:
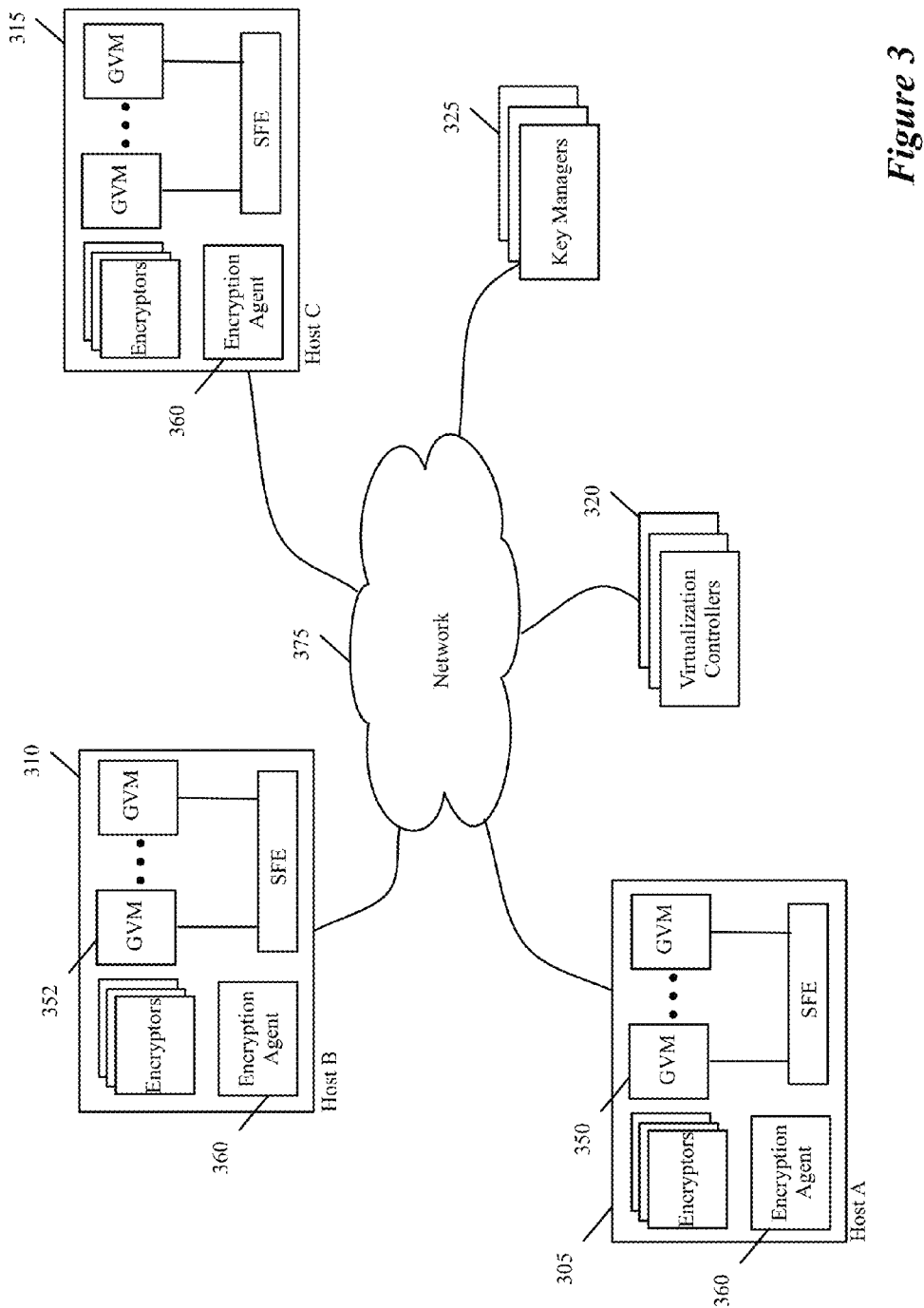
FIG. 3 illustrates an encryption system of some embodiments.

However, before describing this more-detailed architecture, the encryption system 300 of some embodiments will be described by reference to FIG. 3. As shown, this system includes multiple virtualized hosts 305-315, a set of controllers 320, and a set of key managers 325. The virtualized hosts 305-315 are similar to the host 200 of FIG. 2, except that the hosts 305-315 each are shown to include an encryption agent 360 for interacting with the controller set 320 and the key manager set 325. In FIG. 3, the SVM 220, ports 230 and 235, VNICs 225, and the rule data store 250 are not shown in order to keep this figure's illustration simple. As shown in FIG. 3, the hosts 305-315, the controller set 320, and the key manager set 325 communicatively couple through a network 375, which can include a local area network (LAN), a wide area network (WAN) or a network of networks (e.g., Internet).

The network controllers 320 provide control and management functionality for defining and managing the instantiation of one or more GVMs on each host. These controllers in some embodiments also provide control and management functionality for defining and managing multiple logical networks that are defined on the common software forwarding elements of the hosts. In some embodiments, these controller 320 also create security groups, security policies (including encryption policies) and encryption rules. The key managers provide encryption keys for the various encryption rules that the hosts enforce. In some embodiments, the key managers also periodically provide new encryption keys for one or more of the encryption rules, in order to make it harder for third parties to break the encryption scheme.

In some embodiments, the hosts for the source and destination GVMs of a GVM data message use encryption and decryption operations that are statically synchronized as they are configured beforehand to use the appropriate encryption/decryption keys for different data messages. For example, when GVMs 350 and 352 on hosts 305 and 310 are part of one logical network, the controller set 320 or key manager set 325 provides the same cryptographic key(s) (e.g., one identical key, or a pair of associated keys that are transformed versions of each other) to both hosts 305 and 310, such that each host uses the provided key(s) to encrypt all data messages that it receives from it own GVM 350 or 352, and to decrypt all data messages that it receives from the other host's GVM 352 or 350. In some of these embodiments, the controllers and/or key managers periodically refresh the keys that the hosts store for their prospective encryption and decryption operations.

In other embodiments, however, the encryption process is more dynamic. For instance, in some embodiments, the encryption process 100 of the host (e.g., host 305) initially detects a condition that requires data messages form one or more of the host's GVMs (e.g., GVM 350) to be encrypted. This detection can be based on an analysis of the header values of the GVM messages and/or based on a malware scan of the GVM(s). Upon detecting the condition, the host's encryption process identifies an encryption key, uses the encryption key to encrypt some or all of the data message (e.g., the payload and some or all of the message header), and then includes a key identifier (i.e., the key ID) in the data message (e.g., in the message header or in another header that is used to encapsulate the message header) so that the data message's destination (e.g., the destination host 310) can know which key to use to decrypt the encrypted message.

Figure 4:
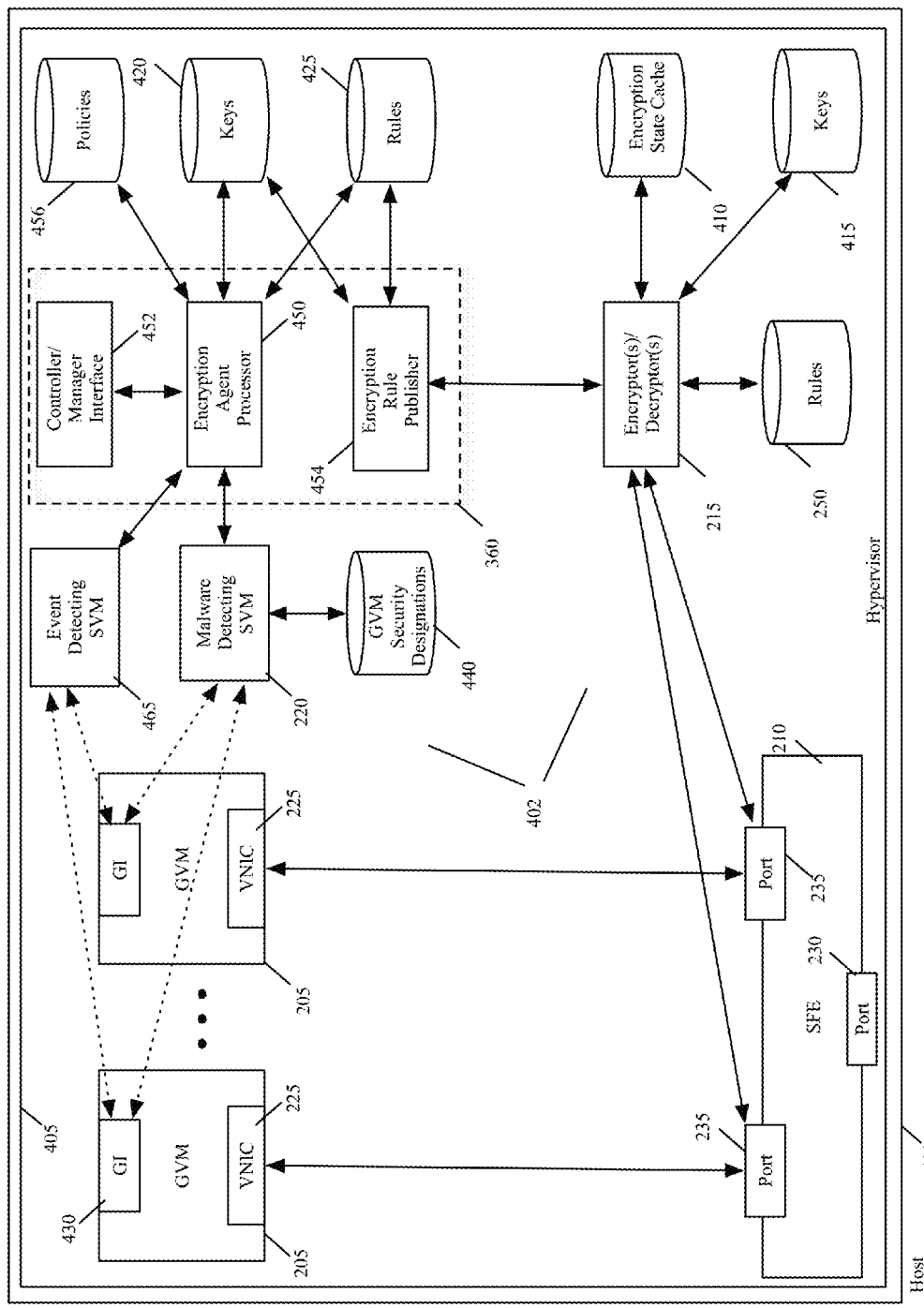
FIG. 4 illustrates another host encryption architecture of some embodiments.

The dynamic encryption process of some embodiments is a hypervisor-based encryption scheme that uses guest introspection (GI) to get application-centric and contextual metadata about network traffic, in order to dynamically apply attribute-based security policies on the GVM traffic, and encrypt the GVM traffic accordingly. FIG. 4 illustrates an example of a hypervisor-based encryption architecture 402 of some embodiments. Specifically, this figure illustrates a host 400 that has many of the same modules as the host 200 of FIGS. 2 and 3, such as the GVMs 205, VNICs 225, SFE 210, SFE ports 230 and 235, encryptor set 215, the SVM 220, encryption rule data store 250, and encryption agent 360.

As shown in FIG. 4, the host 400 also includes the hypervisor 405, an encryption state cache 410, key data stores 415 and 420, an encryption rule data store 425, a flow-based event detecting SVM 465 and guest introspectors 430. The hypervisor 405 is a software layer (e.g., an application) over which the GVMs 205 and other host encryption modules execute. As further described below, these encryption modules allow the host to encrypt and decrypt GVM data messages based on static and/or dynamic encryption schemes. The encryption modules include the previously-described encryptor/decryptor set 215, the encryption rule data store 250, the SVMs 220, and the encryption agent 360. These modules also include encryption state cache 410, the key stores 415 and 420, encryption rule data store 425, and the flow-based event detecting SVM 465, which will be further described below.

To facilitate its dynamic encryption operations, the hypervisor 405 uses guest introspection to obtain application-centric and contextual information about the applications that each GVM runs. In some embodiments, guest introspection provides information about sensitive data, the applications and the users accessing them, and where and how it flows in the network (e.g., the source port associated with the connection session of the application that initiated a flow). It also allows the encryption system to identify the endpoints between which the network traffic needs to be secured, provides a way to isolate the traffic cryptographically, and protects it from the shared infrastructure.

Figure 5:
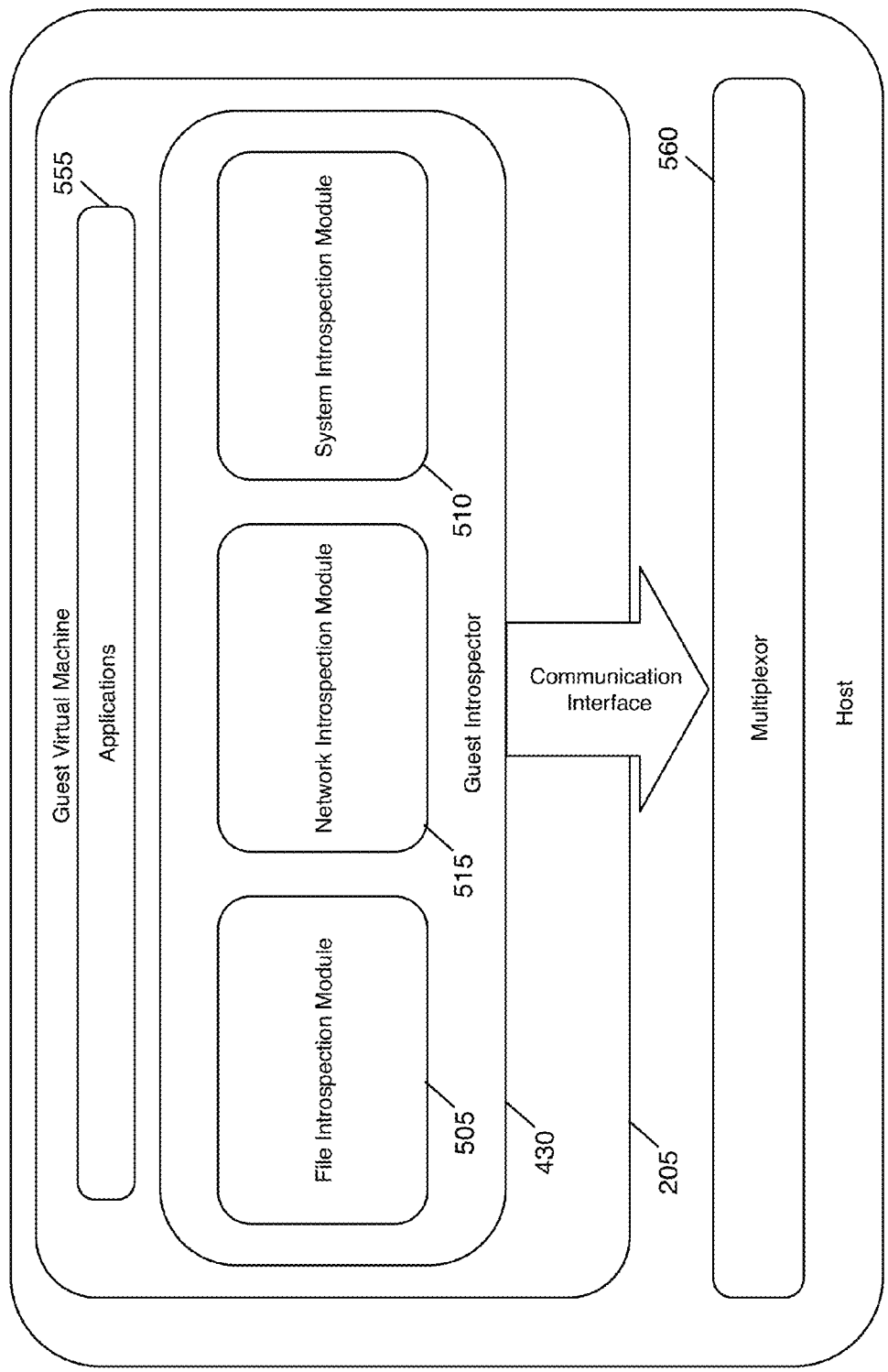
FIG. 5 illustrates the various introspecting modules of a guest introspection (GI) agent of some embodiments.

To perform guest introspection, the hypervisor in some embodiments communicates with the guest introspectors 430. In some embodiments, each guest introspector 430 is a thin introspecting agent that is deployed on a GVM 205. FIG. 5 illustrates the various introspecting modules of a guest introspection (GI) agent 430 of some embodiments. As shown, the introspecting modules of the GI agent 430 includes a file introspector 505, a system introspector 510, and a network introspector 515. In some embodiments, the flow-based event detecting SVM 465 uses the network introspector 515 to obtain real-time data for the real-time analysis that allows the SVM 465 to report to the encryption agent 360 new flow-based events in real-time, so that this agent can push encryption rules in real-time to the encryption rule data store 250 for newly detected flow-based events. Alternatively, in some embodiments, the malware-detecting SVM 220 uses the file and system introspectors 505 and 510 to gather batch data (i.e., non-real-time data) in an offline mode, which allows this SVM to report malware events to the encryption agent 360. For these malware events, the encryption agent 360 can then push encryption rules to the data store 250 that direct the encryptor set 215 to encrypt the messages of the infected GVM and/or the messages of the other GVMs on the same host.

As shown in FIG. 5, the thin agent uses a multiplexing module 560 that receives introspection messages from the various introspectors 505, 510, and 515, and sends these messages to the correct destination (e.g., to the correct SVM 220 or 465). In some embodiments, the introspectors provide the introspection messages to the multiplexor 560 through a VM communication interface (e.g., the VMCI interface of VMware Inc.).

The network introspector 515 of the introspecting agent 430 in some embodiments is called by the GVM's TCP/IP stack each time the stack processes initiates or terminates a connection request. Through these calls, the network introspection module captures (1) every new connection request (e.g., both incoming and outgoing connection requests) that is made by an application 555 that is operating on the GVM 205, and (2) contextual information (e.g., user identity, application context, etc.) for the new connections. In some embodiments, different flows are differentiated based on the source port that is associated with the connection session that is associated with the flow.

For outgoing connections, the network inspector in some embodiments can precisely identify which user initiated the connection, including the Active Directory (AD) groups of which the user is a member. For instance, if different users from the Finance and Human Resources groups of an enterprise are logged in on a terminal server, the network introspector can identify which user from which group initiated a particular network connection. Also, in some embodiments, the network introspector provides the application context with each network connection initiated or accepted by a GVM. For instance, the network introspector in some embodiments provides information about the application associated with every outgoing connection. For incoming connections, it provides detailed information on the listening application in some embodiments. This information in some embodiments includes name of the process, application hash, publisher, etc. The network introspector enables the gathering of this information without the need to do costly deep packet introspection on the received GVM data messages.

Through the multiplexor 560, the thin guest-introspecting agent 430 in some embodiments provides the captured connection sessions and their associated contextual metadata to the flow-based event detecting SVM 465. In some embodiments, the SVM 465 then examines its configuration and cache stores (not shown) to determine whether the captured event is an event for which it should provide a notification to the encryption agent 360, and if so, whether it has previously provided such a notification to the encryption agent 360. The SVM 465 notifies the encryption agent 360 of a flow-based event when the SVM determines that the event is one for which the encryption agent 360 needs to receive a notification. As further described below, the agent then examines its encryption policies for the detected flow-based event, and if necessary, creates and pushes encryption rule(s) to the encryption data store 250 to address the newly detected flow-based event. Based on the pushed rule(s), the encryptor set 215 then encrypts the data messages related to the detected flow-based event.

The file and system introspectors 505 and 510 are used by the malware-detecting SVM 220 to scan the thin agent's GVM for malware. In some embodiments, the file and system introspectors are implemented like the endpoint introspecting agents of the vShield product of VMware Inc. Information about these introspector can be found at:

http://www.vmware.com/files/pdf/vmware-vshield-endpoint-ds-en.pdf http://www.vmware.com/pdf/vshield_51_admin.pdf When this SVM 220 detects a malware event on a GVM, the SVM in some embodiments assigns the GVM with the appropriate malware tag (e.g., an infected tag) in its data store 440. The encryption agent 360 then notices this malware tag (e.g., by receiving notification from the SVM 220 or by receiving a call back from the security-tag data store 440). As further described below, the agent then examines its encryption policies for the malware tag, and if necessary, creates and pushes encryption rule(s) to the encryption data store 250 for the detected malware condition. Based on the pushed rule(s), the encryptor set 215 then encrypts the data messages sent by the infected GVM, or the data messages sent by the other GVMs on the host, or both.

As shown in FIG. 4, the encryption agent 360 includes a controller/manager interface 452, an encryption-agent processor 450, and a publisher 454. The controller/manager interface 452 is responsible for handling the communication with the controller set 320 and the key manager set 325. The agent processor 450 processes events that it receives from the malware-detecting SVM 220 and the flow-based event-detecting SVM 465. Specifically, after receiving one such event, the processor 450 examines encryption policies that it stores in 456 to determine whether it should specify an encryption rule for the received event. The processor 450 receives the encryption policies that it stores in the policy store 456, from the controller set 320.

When the processor 450 determines that it should specify an encryption rule for a received event, the processor 450 checks the agent's encryption rule data store 425 to determine whether it already contains this rule. If not, the processor 450 specifies the encryption rule and stores this rule in the data store 425. In some embodiments, the encryption processor 450 also receives encryption rules from the controller set 320, and stores these rules in the encryption data store 425. The processor 450, in some embodiments, supplies event data (e.g., after receiving a flow-based event or a malware event from the SVM 220 or 465) to the controller set 320 through the interface 452. For some of the reported events, the processor 450 receives encryption rules from the controller set 320 for the supplied event data.

For instance, when the processor reports a flow-based event that a doctor has logged onto an application on a first source GVM and that this application is in communication session with another application on a second destination GVM, the controller set 320 may detect that a nurse has logged onto the other second-GVM application and push an encryption rule to the processor so that the flows from the first GVM's application to the second GVM's application can be encrypted. In some embodiments, the processor 450 also receives encryption rules from the controller set 320. Also, when a GVM is powered on and this GVM is part of a security group with an associated encryption security policy, the controller set 320 will create encryption rules and provide them to the processor 450. In some embodiments, the processor 450 also receives from the controller set, encryption policies after the processor reports the occurrence of a malware or flow-based event. The processor 450 stores the received encryption policies in its policy data store 456.

When the processor 450 receives or specifies an encryption rule for its data store 425, it contacts the key manager set 325 (through the interface 452) and obtains the key that is identified by the key identifier of the encryption rule. The processor 450 then stores the received key in its key data store 420. In some embodiments, the encryption processor 450 also interacts with the controller set 320 and the key manager set 325 to obtain encryption policies, rules and keys in an offline-batch mode. For instance, the processor 450 may receive such policies, rules and keys when the encryption agent 360 is initially being configured. Also, it can receive such policies, rules, and keys when a GVM, a logical forwarding element or logical network is being instantiated on the agent's host. Also, the processor 450 receives key updates periodically or on-demand in order to perform key rotation on one or more encryption keys (e.g., add or remove keys) in the data store 420.

The publisher 454 publishes new encryption rules and their associated keys from the data stores 425 and 420 to the encryption rule data store 250 and key data store 415 of the encryptor set 215. Once the encryption rule has been pushed into the data store 250 by the encryption agent 360, the rule can then be retrieved by the encryptor set 215 so that the rule's associated key can be used to encrypt GVM data messages that are subsequently received from the GVM with the newly created connection session or the GVM with the malware tag. In some embodiments, the encryptor set 215 retrieves the rule's associated key from the key storage 415 based on the key identifier that is provided by the rule.

To find the encryption rule, the encryptor set 215 first examines its encryption state cache 410 that stores all the encryption rules that the encryptor set 215 has recently used to encrypt data messages. As further described below, this cache 410 is smaller and is addressed differently than the encryption data store 250, and therefore is faster to search than the encryption data store 250.

Figure 6:
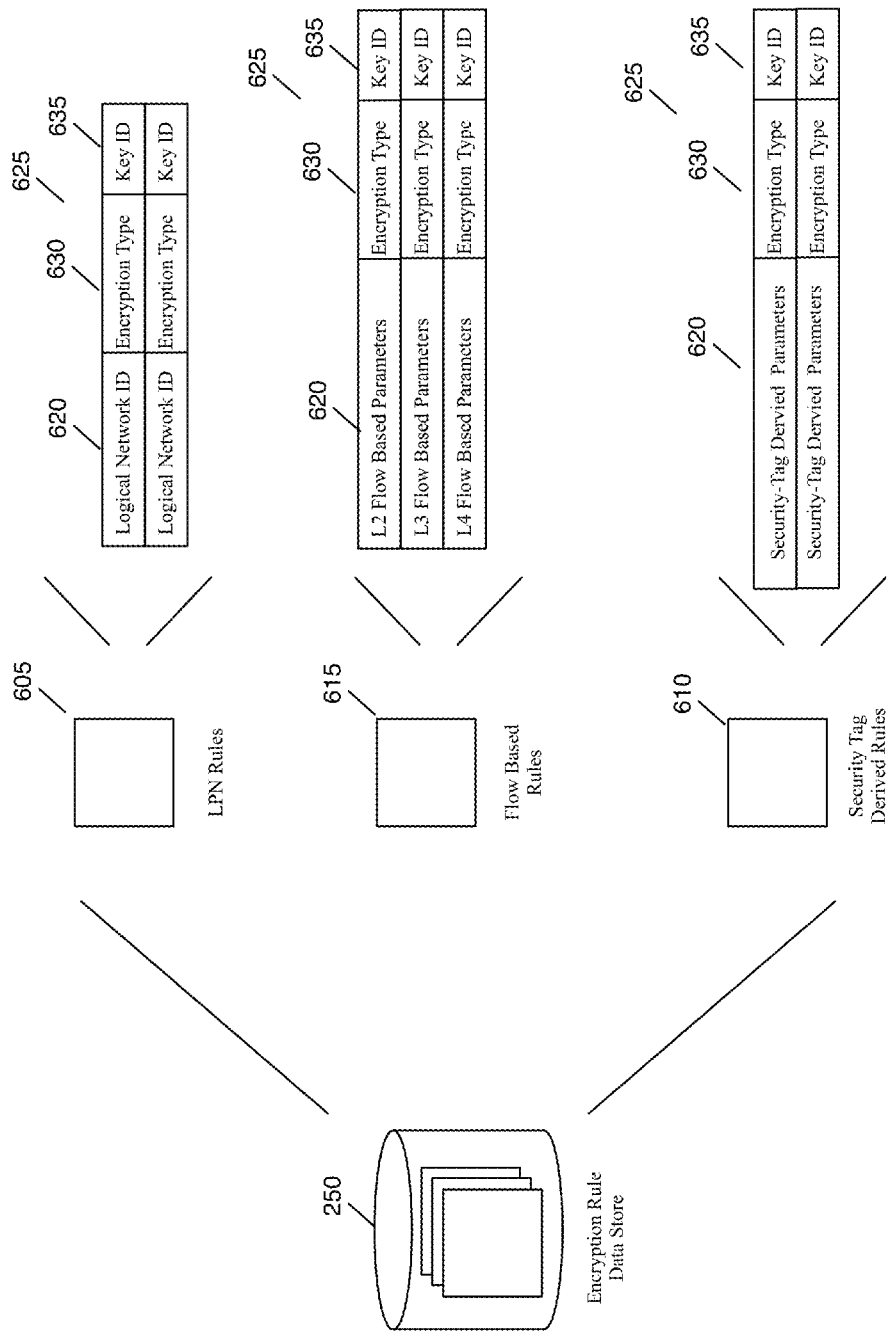
FIG. 6 illustrates examples of various data records stored in an encryption rule data store of some embodiments.

If the encryptor set 215 does not find an encryption rule in its encryption cache 410, it then examines the encryption rules in its encryption rule data store 250. As shown in FIG. 6, the encryption rule data store 250, in some embodiments, can include logical-network encryption rules 605, security-tag-related encryption rules 610, and other general flow-based encryption rules 615. In some embodiments, the logical-network encryption rules 605 specify different encryption keys for differently encrypting the GVM data messages of different logical networks. Security-tag-related encryption rules 610 in some embodiments specify encryption rules for encrypting data messages from GVMs that have been tagged as infected and/or GVMs that operate on hosts with at least one GVM that has been tagged as infected. In some embodiments, flow-based encryption rules 615 specify encryption rules for statically or dynamically detected flow-based events.

As shown in FIG. 6, each rule 605, 610, or 615 has a rule identifier set 620 and a rule attribute set 625. For the logical-network rules 605, the rule identifiers 620 in some embodiments are logical network identifiers (e.g., virtual network identifiers (VNIs) of VXLAN-based logical networks, or virtual distributed router identifiers (VDRIs) of a logical router). For the security-based rules 610 and the general flow-based rules 615, the rule identifiers 620 in some embodiments are arbitrary L2, L3, and L4 header parameters. In some embodiments, the source port (L4 parameter) is used to differentiate GVM data message from different flows between the same two GVMs.

As shown, the rule attribute sets 625 for each of these rule types specifies (1) an encryption type 630 that specifies the type of encryption/decryption to use, and (2) a key identifier 635 that identifies the key to use for the encryption/decryption. In some embodiments, the rule attribute sets 625 only specify the key identifiers 635 and do not specify the encryption types 630, because the key identifiers identify both the key and the type of encryption/decryption. In some embodiments, the rule data store 425 stores its encryption rules in the same format as that shown in FIG. 6 for the rule data store 250.

In some embodiments, rule data store 250 or 425 is searched (e.g., by the encryptor set 215 or the agent 360) by comparing one or more GVM message attributes (e.g., message header values) to the rule identifier sets to identify a rule that has a rule identifier set that matches the GVM message attributes. In some of these embodiments, the rules are stored in the rule data store in a hierarchical way so that when two rules potentially match a GVM message attribute set, the higher priority rule appears first in the order that the rule data store records are searched. Also, in some embodiments, the encryption rule data store has a default rule that is used when no other rule matches a GVM message attribute set; this rule specifies no encryption key as no rule exists for encrypting the GVM data message for the received attribute set. In some embodiments, when the default rule is returned to the encryptor set 215, the encryptor set 215 does not encrypt the GVM data message for which it is performing the check.

In some embodiments, the encryption-state cache 410 stores the encryption rules based on hashed address values. These hashed address values are hashed versions of the messaged-attribute sets 620 that are used to store the encryption rules in the encryption-rule data store 250. The hash address values specify memory locations in the cache 410 that store the corresponding message-attribute sets. Because of this addressing scheme, the encryptor can search for matching records much faster in the cache than in the rule data store 250.

Figure 7:
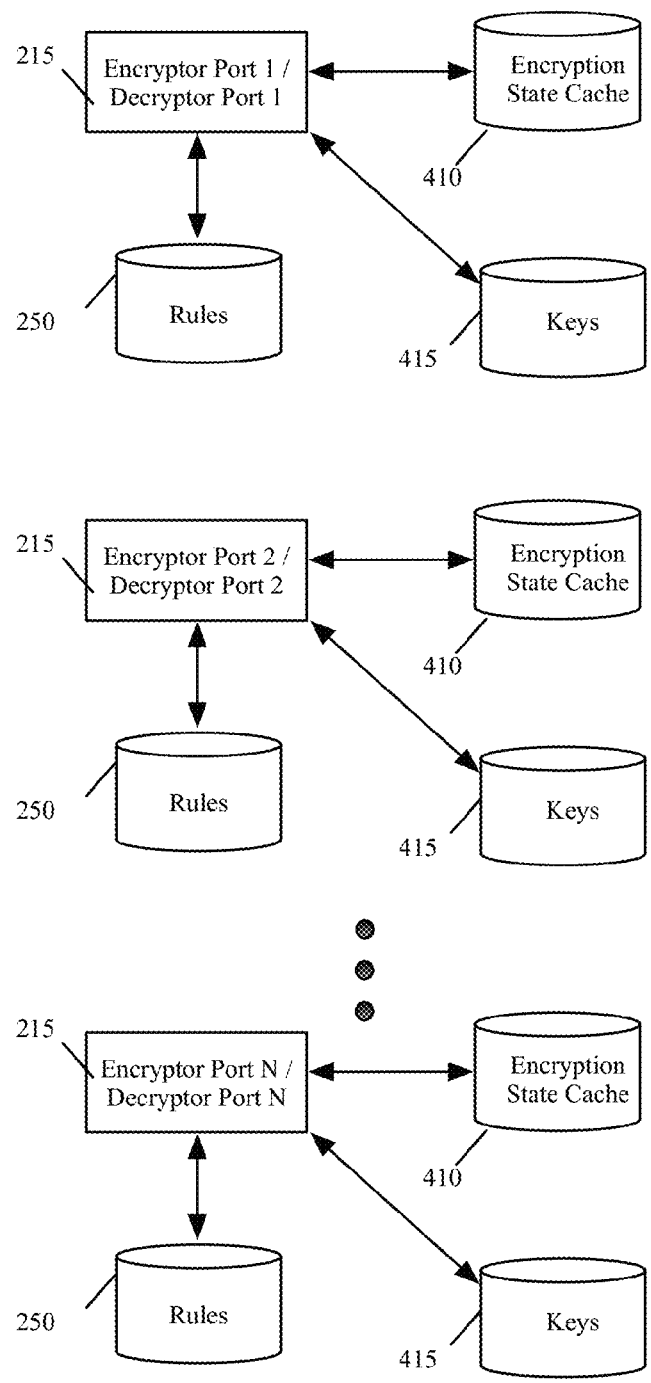
FIG. 7 illustrates various data stores of an encryptor/decryptor of some embodiments.

FIG. 7 illustrates that in some embodiments each encryptor/decryptor pair has its own rules data store 250, encryption state cache 410 and key data store 415. As mentioned above, each SFE port has its own encryptor/decryptor in some embodiments. In FIG. 7, each encryptor/decryptor pair is for one SFE port.

The above-described hypervisor-based encryption scheme combines the best of in-guest encryption and network-based encryption. It avoids the overhead of key management of N-to-N guests, while providing encryption based on fine-grained, context aware policies. As a context-aware, hypervisor-based network encryption that dynamically enforces fine-grained encryption policies, it bridges the gap between having sufficient context to make intelligent security decisions (e.g., to perform context-aware encryption) and maintaining isolation between the encryption and the GVM operations. It uses guest introspection to identify sensitive data flow, gather application-centric and contextual information, which it then uses to perform on demand attribute based encryption.

Figure 8:
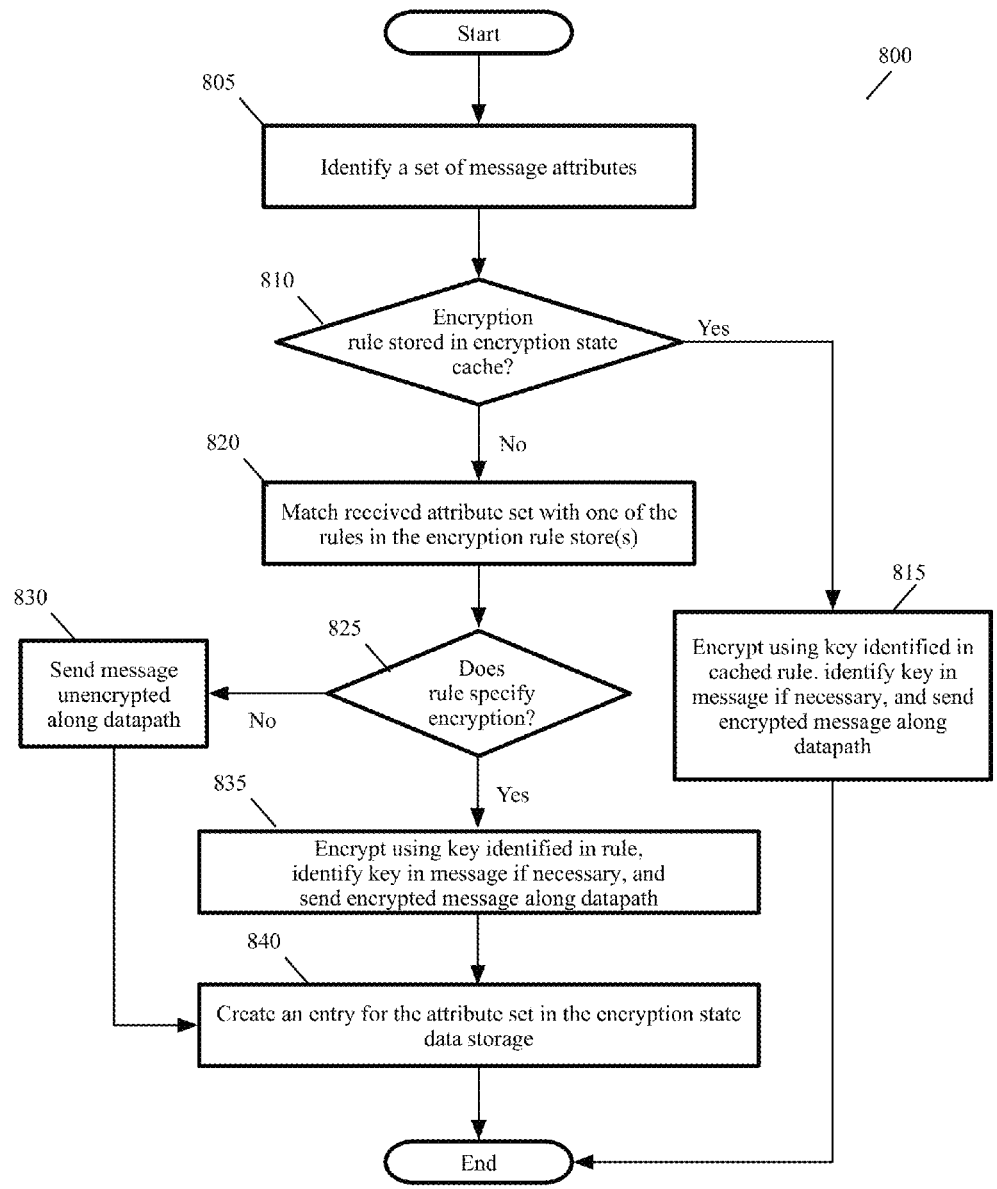
FIG. 8 illustrates an encryption process of some embodiments of the invention.

The encryption and decryption operations of the encryptor set 215 will now be described by reference to FIGS. 8-10. FIG. 8 illustrates a process 800 that the encryptor set 215 performs to encrypt a GVM data message. In some embodiments, an encryptor in the encryptor set 215 performs this operation when its corresponding SFE port 235 calls the encryptor to check whether a data message from the port's GVM should be encrypted, and if so, to encrypt this message.

As shown, the process 800 initially identifies (at 805) a set of message attributes that the process uses to identify an encryption rule that is applicable to the received GVM data message. For different types of encryption rules, the message-attribute sets that are used to retrieve the rules can be different. For instance, when different encryption rules are specified for different logical network constructs (e.g., for different logical forwarding elements (such as logical switches, logical routers, etc.), logical networks, etc.), the encryption rules are stored in the data stores (e.g., data stores 250 or 425) based on logical network-construct identifiers, and the message-attributes sets are the logical identifiers (e.g., the VNIs, VDRIs, the logical MAC addresses, the logical IP addresses, etc.) that are specified in the GVM data messages. When the encryption rules are specified for particular or arbitrary combination of L2-L4 header values, the message-attribute sets can include any combination of the L2-L4 header values of the GVM data message.

After 805, the encryptor determines (at 810) whether its encryption state cache 410 stores a cached encryption rule for the identified set of message attributes. As mentioned above, each time an encryptor finds an encryption rule for a GVM data message in some embodiments, it stores a copy of the encryption rule in the encryption state cache 410, so that when it receives another GVM data message with the same identified message-attribute set (e.g., when it received another GVM data message that is part of the same data flow as the original GVM data message), the encryptor does not have to search the encryption rule data store 250 to identify an encryption rule for the subsequently received GVM data message. In some embodiments, the encryption-state cache 410 stores the encryption rules based on hashed address values that are hashed versions of the messaged-attribute sets that are used to store the encryption rules in the encryption-rule data store 250. This addressing scheme allows the encryptor to search the cache faster than the rule data store 250. Hence, before searching the rule data store 250, the encryptor first generates a hash value from the message-attribute set identified at 805, and then uses this hash value to determine whether the cache stores a matching encryption rule for the received GVM data message.

When the process 800 identifies (at 810) an encryption rule for the received GVM data message is in the cache 410, the process (at 815) then retrieves a key identifier from the identified rule, uses this identifier to retrieve a key from the key data store 415, and encrypts the received GVM data message with the retrieved key. In some embodiments, the process encrypts (at 815) the GVM data message's payload (e.g., the L2 payload) by using the identified encryption key, while generating an ICV hash of the payload and some or all of the header values (e.g., the physical L3 and L4 header values and/or logical L2 or L3 header values), so that the message's destination would have (1) to decrypt the encrypted portion of the GVM message, and (2) to verify the authenticity and integrity of the payload and header values that were used for the ICV calculation.

For some or all of the GVM data messages, the encryption process 800 in some embodiments also encrypts (at 815) a portion of the GVM data message header. For GVM messages that are exchanged between machines associated with a logical network, some embodiments encrypt all of the physical header values of the GVM message, as they use the logical network identifier (e.g., the VNI) of GVM to identify the key for decrypting the encrypted GVM message. Some of these embodiments perform ICV operation on the logical network identifier (e.g., the VNI) and the payload so that the decryptor at the destination host can verify the authenticity and integrity of the encrypted GVM message.

After encrypting the GVM data message, the process (at 815) sends the encrypted GVM data message along its datapath. In some embodiments, this operation entails returning a communication to the SFE port 235 (that called the encryptor to initiate the process 800) to let the port know that the encryptor is done with its processing of the GVM data message. The SFE port 235 can then handoff the GVM data message to the SFE 210 or can call another I/O chain operator to perform another operation on the GVM data message.

When the cached encryption rule that was identified at 810 is a rule that was dynamically created (e.g., by the event detecting SVM 465) after dynamically detecting an event (e.g., after dynamic detection of the start of a connection session or dynamic detection of a malware event), the encryptor has to make sure (at 815) that the key identifier for the key that is used to encrypt the GVM message is included in the GVM message header before it is sent. The process 800 accomplishes this goal differently in different embodiments. In some embodiments, the process 800 passes (at 815) the key identifier to the SFE port 235 (that called it) so that the port or an I/O chain operator that it calls can insert the key identifier in the GVM message header. For instance, in some embodiments, one I/O chain operator encapsulates the GVM message with a header for a logical network identifier that is used to establish an overlay logical network. In some of these embodiments, the SFE port 235 passes the key identifier that it receives from the process 800 to the encapsulating I/O chain operator so that it can include this key identifier in its header. In other embodiments, the process 800 inserts the key identifier in the GVM message header. In some embodiments, the process 800 encapsulates the GVM message with a header for a logical network, and in some of these embodiments, the process inserts the key identifier in the encapsulating header values. The marking of the key identifier in the GVM message header will be further described below.

After 815, the process 800 ends.

When the process 800 determines (at 810) that the encryption cache 410 does not store an encryption rule for the received GVM data message, the process 800 searches (at 820) the encryption rule data store 250 to identify an encryption rule that matches the received GVM message's attribute set identified at 805. In some embodiments, the encryption rule data store has a default encryption rule that matches all GVM data message, and is returned when no other encryption rule matches the attribute set of a received GVM message. The default encryption rule specifies that the received data message should not be encrypted (e.g., specifies a default key identifier that corresponds to a no-encryption operation). On the other hand, non-default encryption rules in the encryption data store 250 specify key identifiers that identify keys for encrypting and decrypting the GVM data message.

After 820, the process determines (at 825) whether it was able to identify an encryption rule that specifies an encryption key for encrypting the received GVM data message. If not (e.g., if the process only identified a default encryption rule that does not provide an encryption key), the process sends (at 830) the message unencrypted along the message's datapath. This operation 830 entails informing its SFE port 235 that it has completed processing the GVM data message. After 830, the process transitions to 840, where in the encryption cache data store 410, it creates a record to indicate that no encryption should be performed for the received GVM data message. In some embodiments, this record is addressed in the cache 410 based on a hash value of the message-attribute set identified at 805. The process 800 does not create a record in the cache data store 410 when it determines that a GVM data message should not be encrypted.

When the process determines (at 825) that it was able to identify (at 820) an encryption rule that specifies an encryption key, the process then (at 835) retrieves a key identifier from the identified rule, uses this identifier to retrieve a key from the key data store 415, and encrypts the received GVM data message with the retrieved key. This encryption of the GVM data message (at 835) is identical to the encryption operation 815 that was above described. For instance, as described above, the process 800 encrypts the GVM data message's payload (e.g., the L2 payload) by using the identified encryption key, while performing ICV operation on the payload and some or all of the header values (e.g., the physical L3 and L4 header values, logical L2 or L3 header values, and/or the logical network identifiers, such as VNIs and VDRIs). For some or all of the GVM data messages, the encryption process 800 in some embodiments also encrypts (at 835) some or all of the GVM data message header (e.g., encrypts some or all of the physical header values when the logical network identifier, such as the VNI, is used to identify the key for decrypting the encrypted GVM message).

After encrypting the GVM data message, the process (at 835) sends the encrypted GVM data message along its datapath. Again, in some embodiments, this operation entails returning a communication to the SFE port 235 (that called the encryptor to initiate the process 800) to let the port know that the encryptor is done with its processing of the GVM data message. The SFE port 235 can then handoff the GVM data message to the SFE 210 or can call another I/O chain operator to perform another operation on the GVM data message.

When the cached encryption rule that was identified at 810 is a rule that was dynamically created (e.g., by the event detecting SVM 465) after dynamically detecting an event (e.g., after dynamic detection of the start of a connection session or dynamic detection of a malware event), the encryptor has to make sure (at 835) that the key identifier for the key that is used to encrypt the GVM message is included in the GVM message header before it is sent. The different manners for accomplishing this goal in different embodiments were described above when the operation 815 was being described.

After 835, the process transitions to 840, where in the encryption cache data store 410, it creates a record to indicate that encryption key that should be used to encrypt GVM data message with message-attribute sets that are similar to the set identified at 805. In some embodiments, this record is addressed in the cache 410 based on a hash value of the message-attribute set identified at 805. After 840, the process ends.

Figure 9:
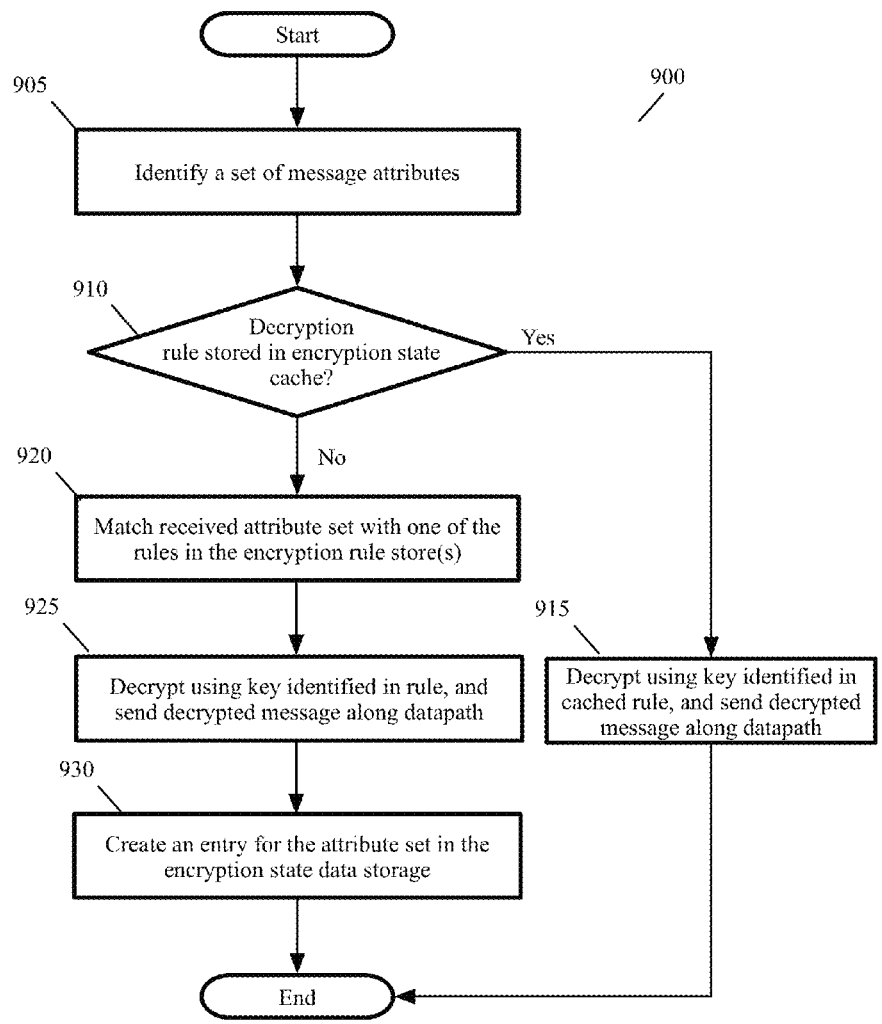
FIGS. 9 and 10 illustrate decryption processes of some embodiments of the invention.

FIG. 9 illustrates a process 900 that the encryptor set 215 performs to decrypt an encrypted GVM data message that a SFE port 235 receives. In some embodiments, an decryptor in the encryptor set 215 performs this operation when its corresponding SFE port 235 calls the decryptor to check whether a received GVM data message is encrypted, and if so, to decrypt this message. In some embodiments, the decryptor performs this process only if the header value of the received GVM message does not specify a key identifier that identifies a key for decrypting the GVM message. When the header value does specify such a key identifier, the decryptor uses a decryption process 1000 of FIG. 10, which will be described below. Also, in some embodiments, the received GVM data message has a value (e.g., a bit) that specifies whether the message is encrypted. By analyzing this value, the decryptor will know whether the message is encrypted. When this value specifies that the message is not encrypted, the decryptor does not call either the process 900 or 1000 to decrypt the encrypted message. Instead, the decryptor informs the SFE port that it can send the GVM data message along its datapath.

As shown, the process 900 initially identifies (at 905) a set of message attributes that the process uses to identify an encryption rule that is applicable to the received GVM data message. For different types of encryption rules, the message-attribute set that is used to retrieve the rule can be different. Several examples of such message-attribute sets for different types of encryption rules were provided above while describing the process 800 of FIG. 8. These examples are equally applicable to the discussion of the process 900 of FIG. 9.

After 905, the decryptor determines (at 910) whether its encryption state cache 410 stores a cached encryption rule for the identified set of message attributes. Like an encryptor, each time a decryptor finds an encryption rule for a GVM data message in some embodiments, it stores a copy of the encryption rule in the encryption state cache 410, so that when it receives another GVM data message with the same identified message-attribute set (e.g., when it received another GVM data message that is part of the same data flow as the original GVM data message), the decryptor does not have to search the encryption rule data store(s) to identify an encryption rule for the subsequently received GVM data message. As mentioned above, the encryption-state cache 410, in some embodiments, stores the encryption rules based on hashed address values that are hashed versions of the messaged-attribute sets that are used to store the encryption rules in the encryption-rule data store. Accordingly, before searching the rule data store 250, the decryptor in some embodiments first generates a hash value from the message-attribute set identified at 905, and then uses this hash value to determine whether the cache stores a matching encryption rule for the received GVM data message.

When the process 900 identifies (at 910) an encryption rule for the received GVM data message in the cache 410, the process (at 915) then retrieves a key identifier from the identified rule, uses this identifier to retrieve a key from the key data store 415, and decrypts the encrypted portion of the received GVM data message with the retrieved key. In some embodiments, part of the decryption operation (at 915) is to authenticate the ICV generated hash of the GVM message header and payload. Specifically, when a portion of the received GVM data message (e.g., its physical (e.g., L3 or L4) header values, or its logical (e.g., VNI) header values) is hashed along with the payload through an ICV operation by the encryptor, the decryption operation verifies this portion to validate the authenticity and integrity of the encrypted GVM data message.

After decrypting the GVM data message (at 915), the process (at 915) sends the decrypted GVM data message along its datapath. In some embodiments, this operation entails returning a communication to the SFE port 235 (that called the decryptor to initiate the process 900) to let the port know that the decryptor is done with its processing of the GVM data message. The SFE port 235 can then handoff the GVM data message to the destination GVM or can call another I/O chain operator to perform another operation on the GVM data message. After 915, the process 900 ends.

When the process 900 determines (at 910) that the encryption cache 410 does not store an encryption rule for the received GVM data message, the process 900 searches the encryption rule data store 250 to identify an encryption rule that matches the message-attribute set identified at 905. If the process cannot find an encryption rule that identifies a key, and the GVM data message is encrypted (e.g., as specified by field in the message), the process 900 in some embodiments initiates an error handling process to resolve the unavailability of a decryption key for decrypting the encrypted message. This error handling process in some embodiments queries the network agent 360 to determine whether it or the controller set stores an encryption rule for the message attribute set identified at 905. When the agent has such an encryption rule, it provides it to the process (at 920). However, in other embodiments, the error handling process does not contact the network agent 360 to obtain the key. Instead, it just flags this issue for an administrator to resolve.

Assuming that the process identifies (at 920) an encryption rule that identifies a key, the process (at 925) retrieves a key identifier from the identified rule, uses this identifier to retrieve a key from the key data store 415, and decrypts the received GVM data message with the retrieved key. In some embodiments, part of the decryption operation (at 925) is to authenticate an ICV generated hash of the GVM message header and payload. Specifically, when a portion of the received GVM data message (e.g., its physical (e.g., L3 or L4) header values, or its logical (e.g., VNI) header values) is hashed through an ICV operation along with the payload by the encryptor, the decryption operation verifies this portion to validate the authenticity and integrity of the encrypted GVM data message.

After decrypting the GVM data message, the process (at 925) sends the decrypted GVM data message along its datapath. In some embodiments, this operation entails returning a communication to the SFE port 235 (that called the decryptor to initiate the process 900) to let the port know that the decryptor is done with its processing of the GVM data message. The SFE port 235 can then handoff the GVM data message to the destination GVM or can call another I/O chain operator to perform another operation on the GVM data message.

After 925, the process transitions to 930, where in the encryption cache data store 410, it creates a record to specify that decryption key that should be used to decrypt GVM data message with message-attribute sets that are similar to the set identified at 905. In some embodiments, this record is addressed in the cache 410 based on a hash value of the message-attribute set identified at 905. After 940, the process ends.

For GVM data messages that are encrypted based on dynamically detected events (e.g., dynamically detected connection sessions), the GVM data messages in some embodiments include a key identifier that identifies the encryption key that was used to encrypt the message or the decryption key that should be used to decrypt the message. Some embodiments use a symmetric encryption scheme in which the same key is used to encrypt and decrypt the message, or transposed versions of the same key are used to encrypt and decrypt the message. In these embodiments, the GVM data message can be marked with the encryption key identifier or the decryption key identifier as the encryption and decryption keys are identical or related.

Figure 10:
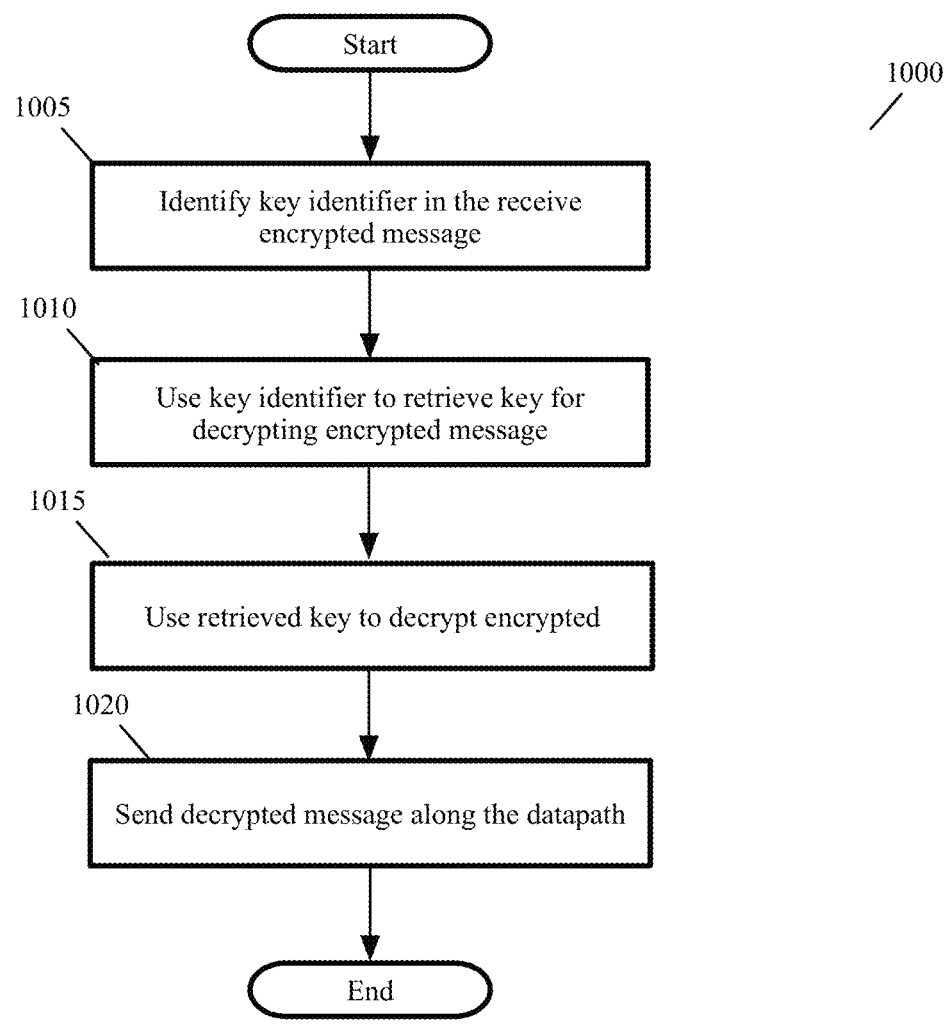

FIG. 10 illustrates a process 1000 that the encryptor set 215 performs to decrypt an encrypted GVM data message that includes an encryption/decryption key identifier. In some embodiments, a decryptor in the encryptor set 215 performs this operation when its corresponding SFE port 235 calls the decryptor to check whether a received GVM data message is encrypted, and if so, to decrypt this message. In some embodiments, the decryptor performs this process only if the header value of the received GVM message specifies a key identifier that identifies a key for decrypting the GVM message.

As shown, the process 1000 initially extracts (at 1005) the key identifier from the received GVM message. Next, the process uses (at 1010) the key identifier to retrieve a key from the key data store 415, and then uses (at 1015) this key to decrypt the received GVM data message. As mentioned above, part of the decryption (at 1015) is to authenticate the ICV generated hash (of the received GVM data message's header and payload) that is encrypted with the payload of the GVM data message. After decrypting the GVM data message, the process sends (at 1020) the decrypted GVM data message along its datapath. In some embodiments, this operation entails returning a communication to the SFE port 235 (that called the decryptor to initiate the process 1000) to let the port know that the decryptor is done with its processing of the GVM data message. The SFE port 235 can then handoff the GVM data message to the destination GVM or can call another I/O chain operator to perform another operation on the GVM data message. After 1020, the process 1000 ends.

By applying fine-grained encryption policies, the encryption architecture of FIG. 4 can easily achieve a variety of different encryption scenarios. For instance, it can encrypt differently the data messages for different GVMs that execute on the host. This architecture can also differently encrypt the data messages exchanged between the GVMs of different logical networks in a data center that provides different logical networks to different users (e.g., different departments, different tenants, etc.) on shared a network infrastructure. This hypervisor-based architecture can also encrypt different types of data messages from the same GVM differently. Through guest introspection, it can gather malware data, application-centric data and contextual data, and use this information to detect security events or other types of events. Once such events are detected, it can then dynamically provide the encryptors with encryption rules necessary for performing on-demand, attribute-based encryption of the GVM data messages.

Figure 11:
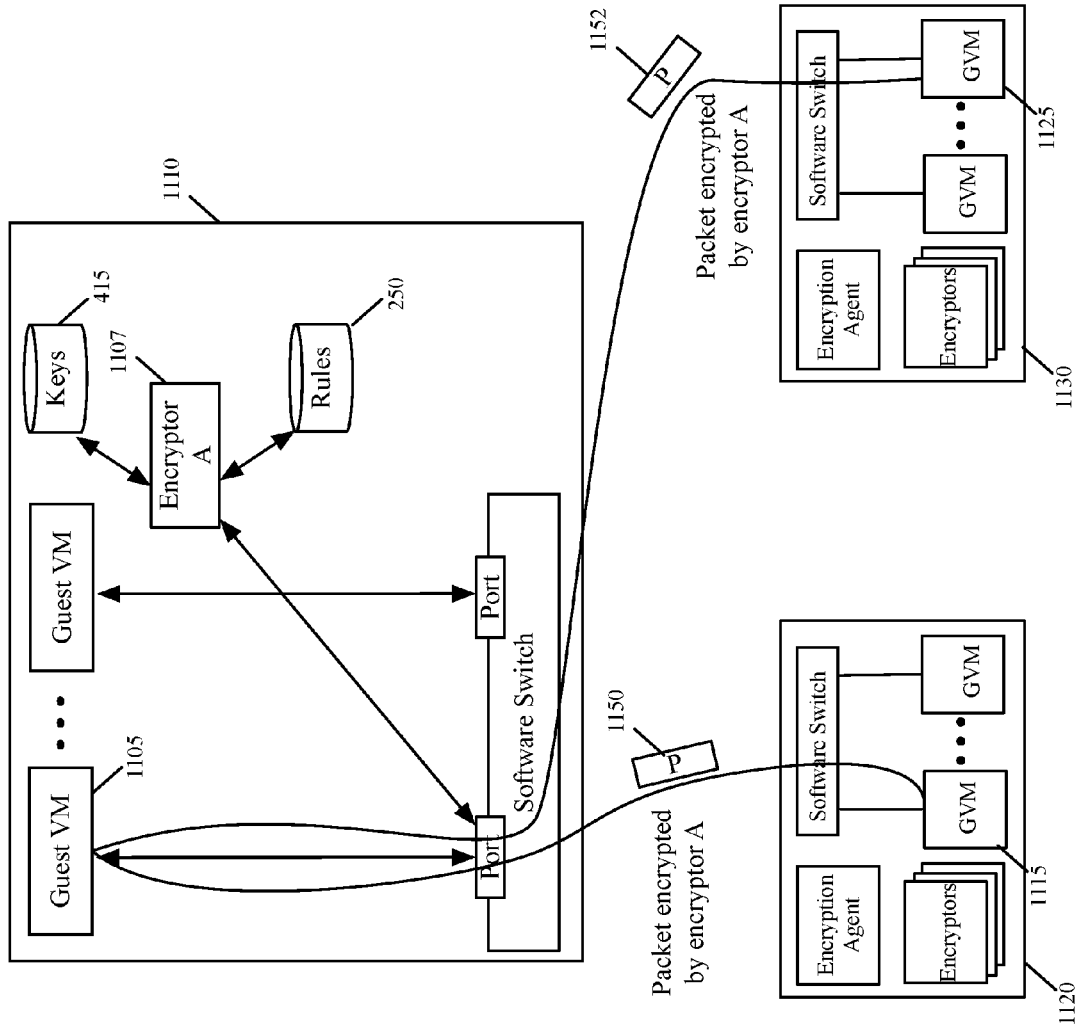
FIGS. 11-13 illustrate several examples of the different encryption scenarios that the encryption architecture of FIG. 4 can achieve.

FIGS. 11-17 illustrate several examples of the different encryption scenarios that the encryption architecture of FIG. 4 can achieve. FIG. 11 illustrates an example in which the encryption architecture 402 differently encrypts data messages from one GVM to two different GVMs. In this example, a GVM 1105 on a host 1110 sends one packet 1150 to a GVM 1115 on a host 1120, and a second packet 1152 to a GVM 1125 on a host 1130. In this example, an encryptor 1107 on the host 1110 encrypts the two different packets 1150 and 1152 differently. To encrypt these packets differently, the encryptor (1) uses packet header values including the destination identifiers (e.g., the destination IP addresses) to identify two different encryption rules in the data store 250 that provide two different key identifiers, (2) uses these identifiers to retrieve two different keys from the key store 415, and (3) differently encrypts the packets by using the different encryption keys.

Accordingly, the two secure connections between GVM 1105 and GVMs 1115/1125 can differ because they are established through two different keys. They can also differ by the different type of encryption operation that is performed for each connection. For instance, the secure connection between GVMs 1105 and 1115 might be an L2 secure connection (where L2 header and payload are encrypted), while the secure connection between GVMs 1105 and 1125 might be an L4 secure connection (where L4 header and payload are encrypted).

It might be beneficial to differently encrypt the GVM messages that GVM 1105 exchanges with GVMs 1115 and 1125, because the GVMs 1115 and 1125 might be used by different entities with which the GVM 1105 should have different secure connections. Also, the GVMs 1115 and 1125 can be different types of machines (e.g., one can be a webserver, while the other is a database server) that require different secure connections with the GVM 1105. In fact, the secure connections between the two different pairs of machines might need to be two different types of connections (e.g., an L2 secure connections versus an L4 secure connections).

Figure 12:
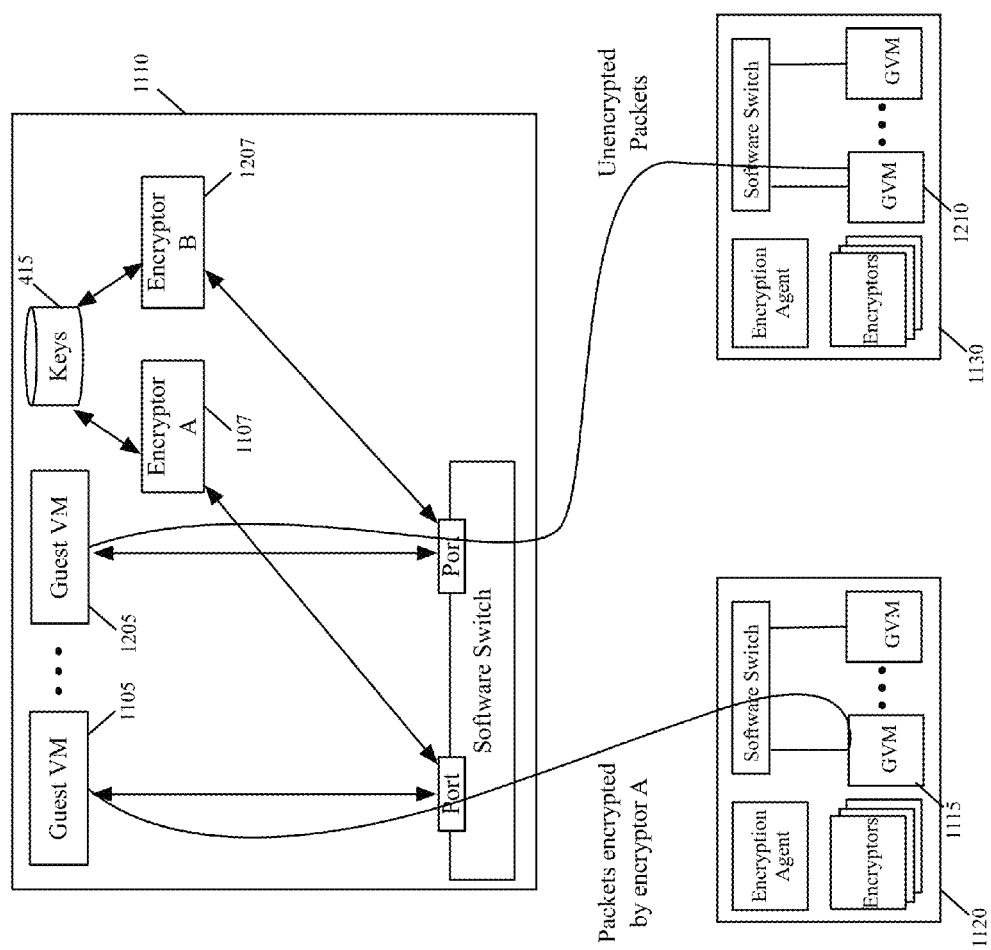

FIG. 12 illustrates another encryption scenario in which the communication between one pair of GVMs is encrypted differently than the communication between another pair of GVMs. Specifically, in this example, the packets that are exchanged between GVMs 1105 and 1115 on hosts 1110 and 1120 are encrypted while the packets exchanged between GVMs 1205 and 1210 on hosts 1110 and 1130 are not encrypted. This occurs because while the encryptor 1107 on the host 1110 identifies an encryption rule that provides a key for encrypting the communication between GVMs 1105 and 1115, the encryptor 1207 on this host 1110 does not identify an encryption rule that provides a key for encrypting the communication between GVMs 1205 and 1210. The communication between GVMs 1205 and 1210 might not be encrypted because it is not as sensitive as the communication between GVMs 1105 and 1115, which needs to be encrypted. For instance, the users that are logged onto the GVMs 1205 and 1210 might not need their communications encrypted.

Figure 13:
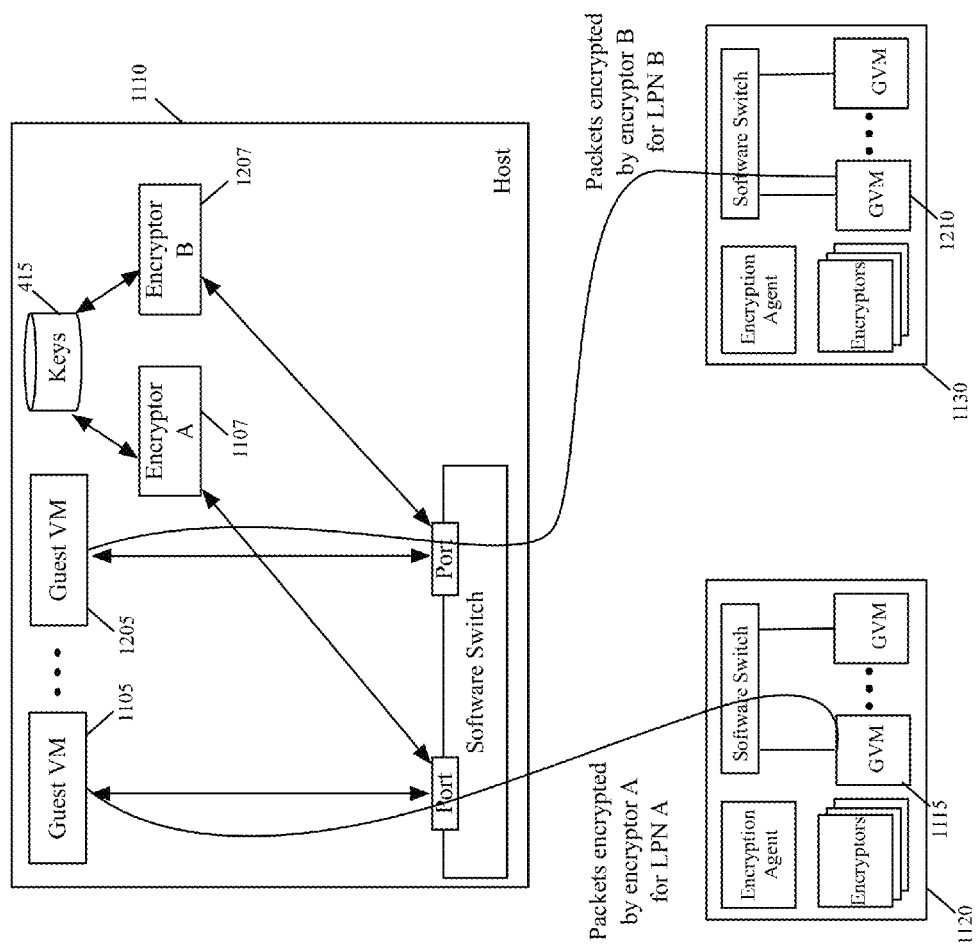

FIG. 13 illustrates an example where the communication between different pairs of GVMs is encrypted differently because the different pairs of GVMs operate in different logical networks. This example is identical to the example illustrated in FIG. 12 except that the communication between GVMs 1105 and 1115 is encrypted by a first encryption key that is used to encrypt communication in a first logical network, while the communication between GVMs 1205 and 1210 is encrypted by a second encryption key that is used to encrypt communications in a second logical network. In some embodiments, the encryptors 1107 and 1207 identify the encryption rules that specify the encryption keys based on the logical network identifiers (e.g., the VNIs or VDRIs) that are specified in the packets that are sent from the GVMs 1105 and 1205.

Figure 14:
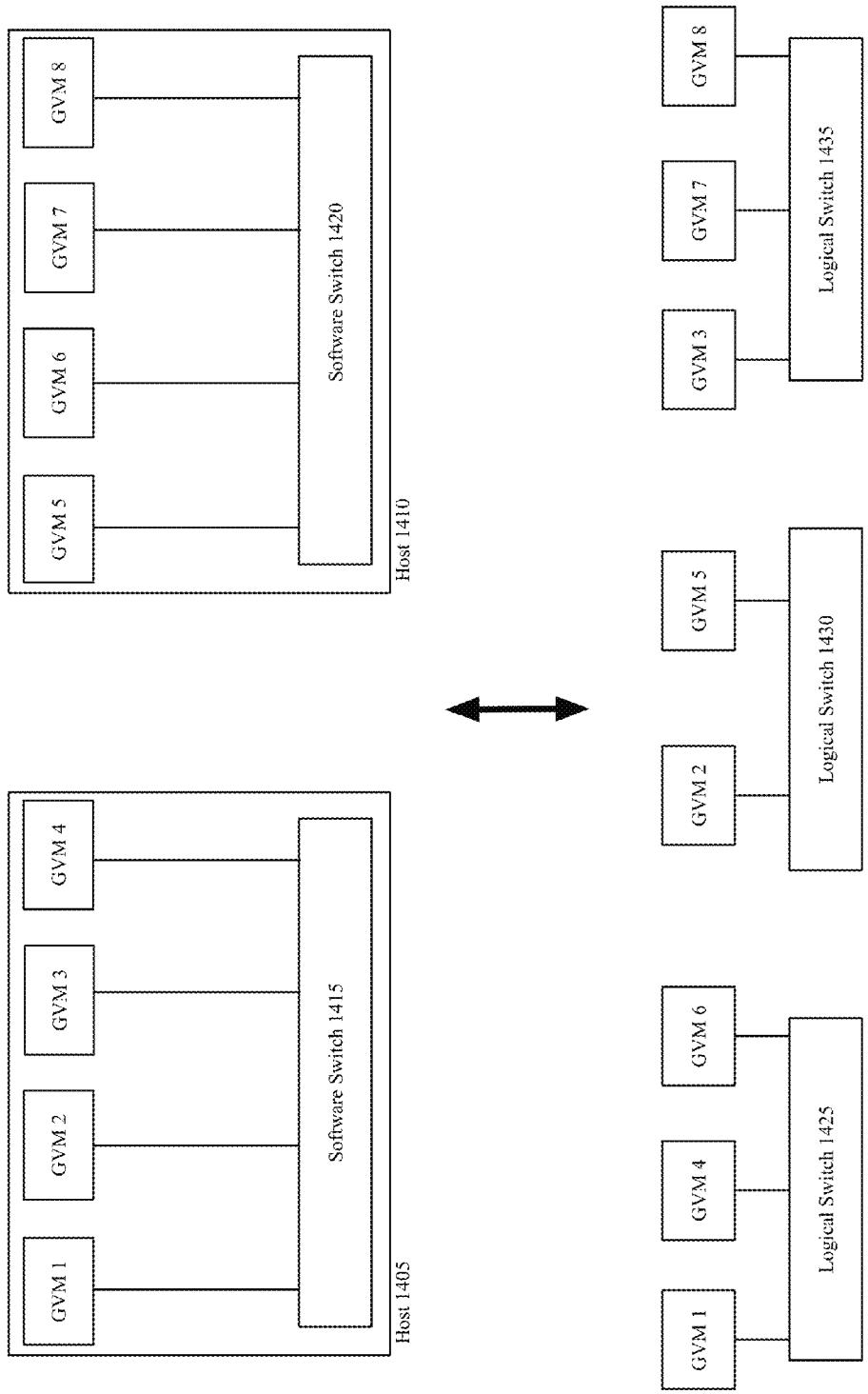
FIG. 14 illustrates an example of several logical switches that are defined by multiple software switches that execute on multiple hosts.

To illustrate the concept of logical network constructs, FIG. 14 illustrates an example of several logical switches that are defined by multiple software switches that execute on multiple hosts. Specifically, this figure illustrates eight GVMs (GVM 1 to GVM 8) that execute on two hosts 1405 and 1410, which include two software switches 1415 and 1420, respectively. As shown, the two software switches 1415 and 1420 implement three logical switches 1425, 1430, and 1435 that connect three sets of GVMs for three different entities (e.g., three different tenants). Logical switch 1425 connects GVMs 1 and 4 of host 1405 and GVM 6 of host 1410, logical switch 1430 connects GVM 2 of host 1405 and GVM 5 of host 1410, and logical switch 1435 connects GVMs 7 and 8 of host 1410 and GVM 3 of host 1405.

In hypervisors, software switches are sometimes referred to as virtual switches because they are software and they provide the GVMs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. VXLAN provides one manner for creating such logical switches. The VXLAN standard is described in Mahalingam, Mallik; Dutt, Dinesh G.; et al. (2013-05-08), VXLAN: A Framework for Overlaying Virtualized Layer 2 Networks over Layer 3 Networks, IETF.

Figure 15:
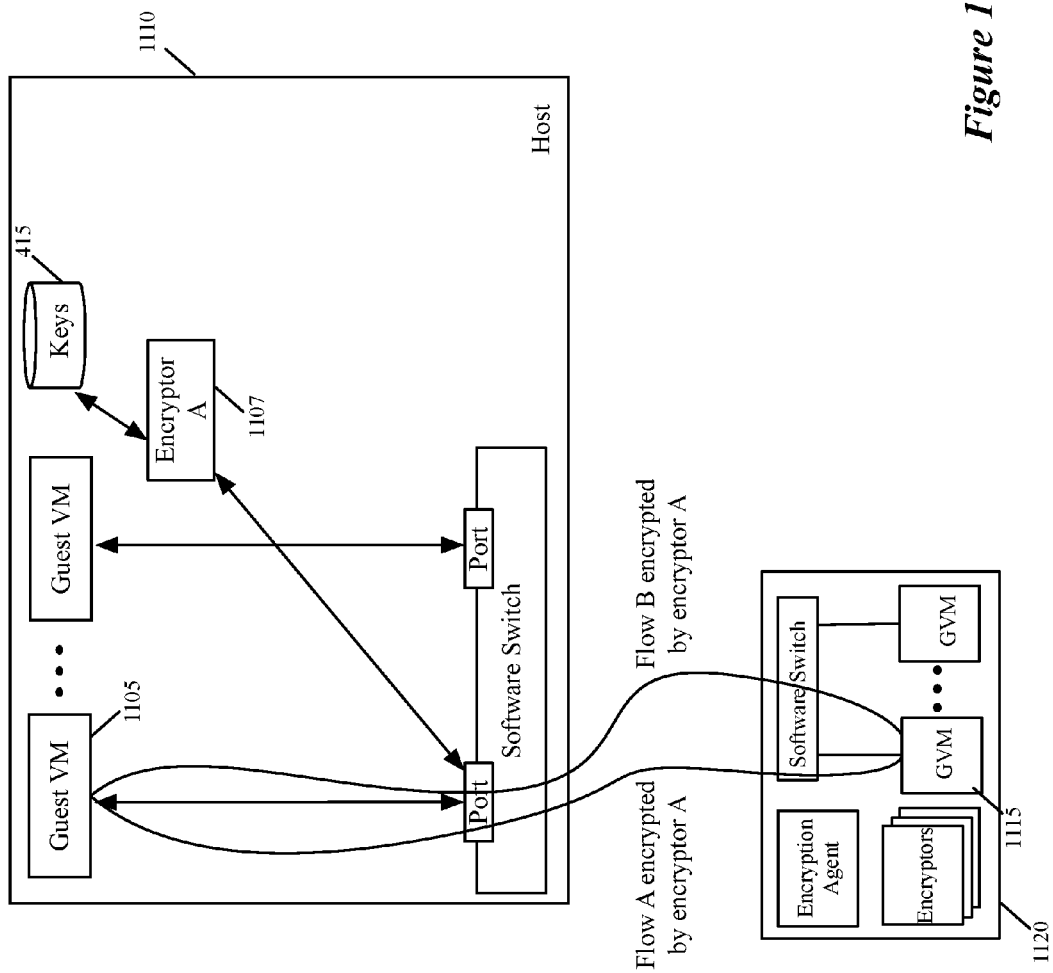
FIG. 15 illustrates an encryption scenario in which two different flows between the same pair of GVMs are encrypted differently.

As mentioned above, the encryption architecture 402 of FIG. 4 can also implement fine-grained, flow-based encryption rules. To illustrate this capability, FIG. 15 illustrates an encryption scenario in which two different flows between the same pair of GVMs are encrypted differently. In this example, the encryptor 1107 encrypts a first flow between GVMs 1105 and 1115 differently than a second flow between these GVMs. In some cases, the encryptor just uses different keys to encrypt these two different flows. In other cases, the encryptor uses different encryption schemes for these flows (e.g., an L2 encryption scheme for one flow and an L4 encryption scheme for another flow, or a first encryption algorithm for one flow and a second encryption algorithm for the other flow).

To identify the different encryption rules for the different flows, the encryptor in some embodiments uses each flow's L2-L4 header values to identify an encryption rule with a matching attribute set. In some of these embodiments, the source port identifier helps differentiate two flows that have otherwise identical header values. In other words, the source port identifier can serve to distinguish two different connection sessions between two GVMs.

Also, as mentioned above, the event-detecting SVM 465 detects one or more events relating to the flows, and in response, has the encryption agent 360 insert or remove encryption rules from the rule data store 250. As mentioned above, the event-detecting SVM 465 obtains real-time guest-introspection (GI) data, in order to detect one or more events relating to the flows, so that it can start the process for the insertion of the encryption rules.

As further discussed above, the malware-detecting SVM 220 obtains GI data in order to detect malware on the GVMs. Upon detecting malware, this SVM assigns the appropriate malware tag to the GVM in a data store that it maintains. In response to this tagging, the encryption agent 360 pushes encryption rules into the encryption data store 250 that cause the encryptor set 215 to encrypt the messages sent from the infected GVM and/or to encrypt the messages sent from other GVMs on the same host as the infected GVM.

Figure 16:
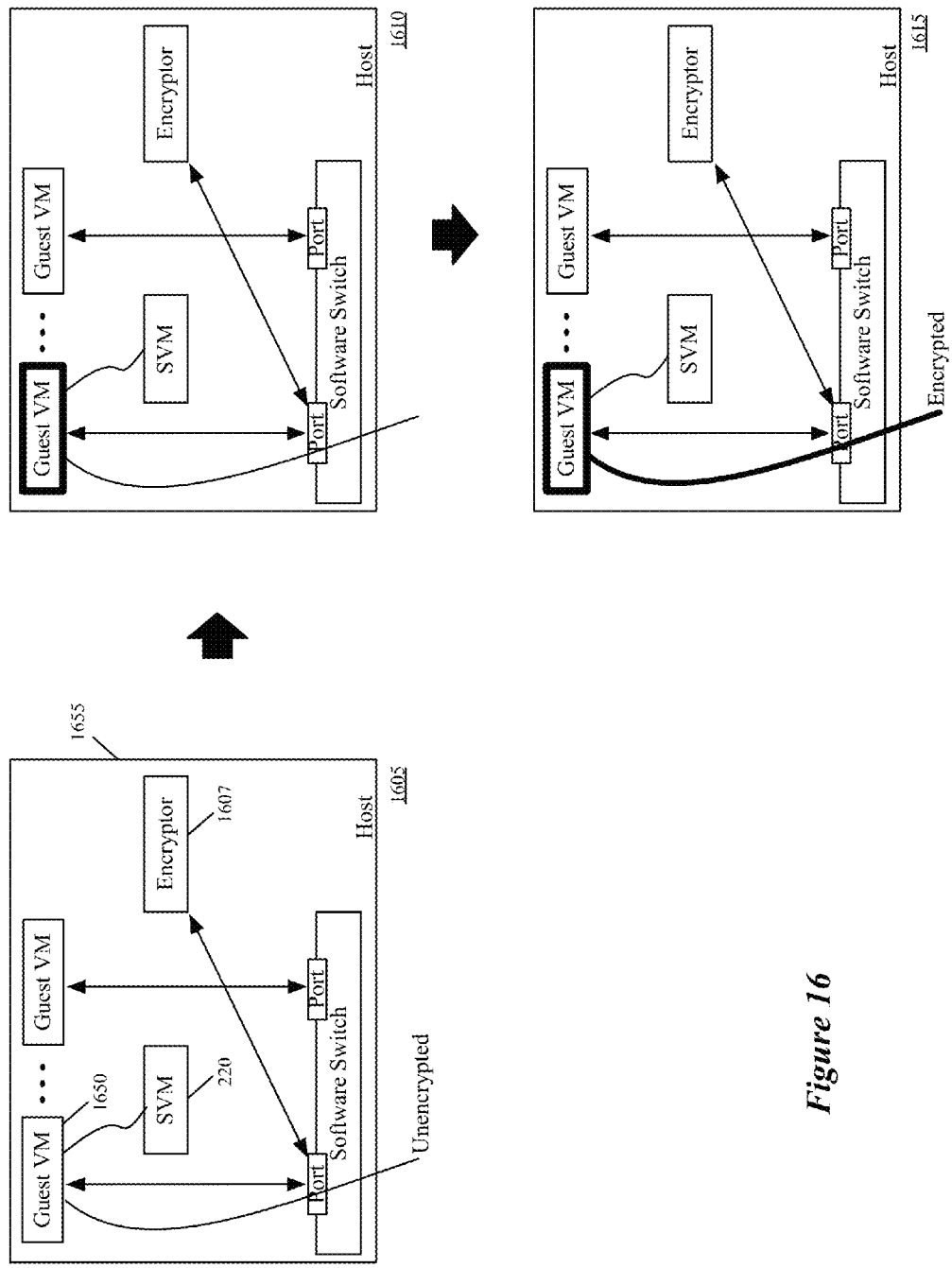
FIGS. 16 and 17 present two examples that illustrate dynamically encrypting packets after the detection of malware.
Figure 17:
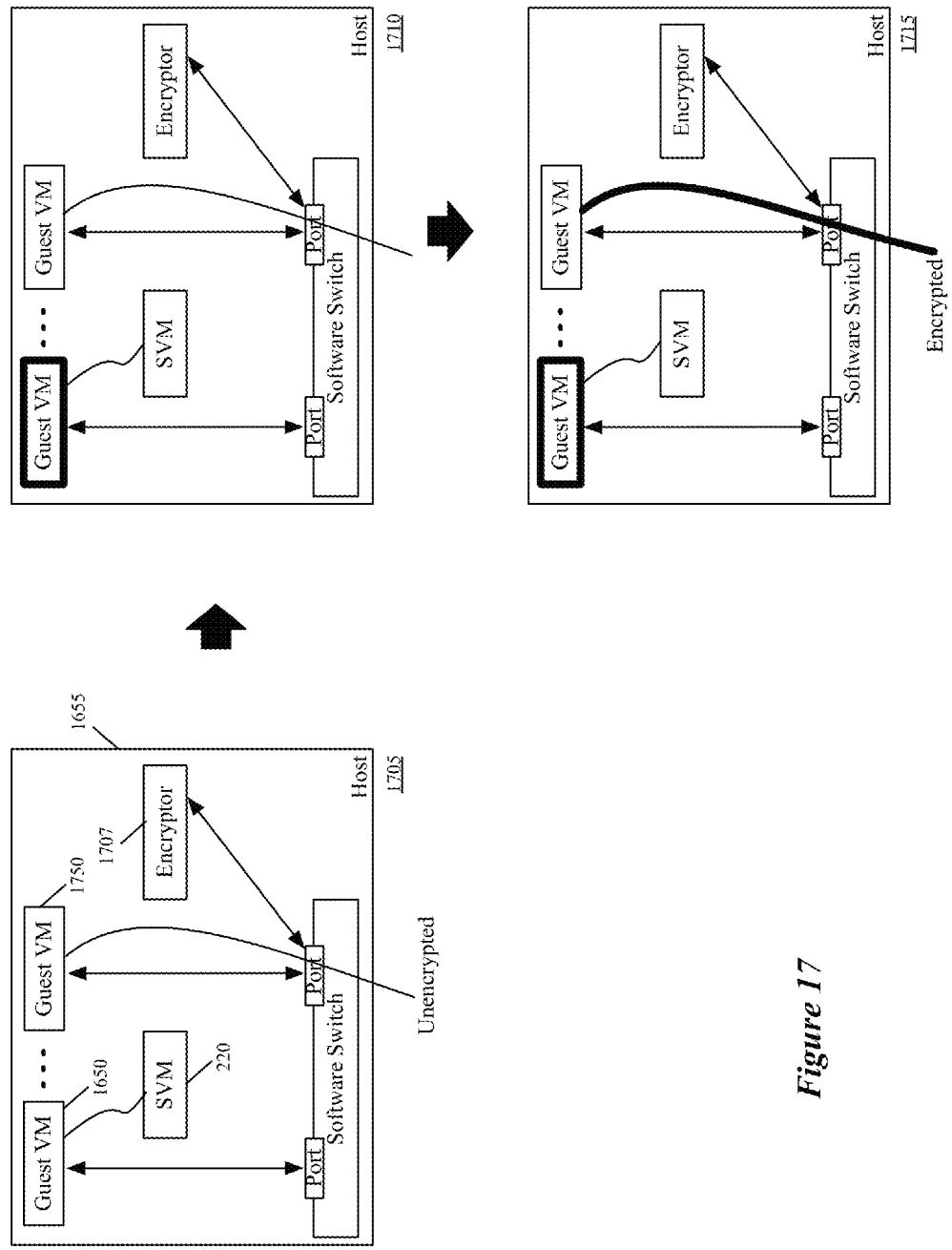

FIGS. 16 and 17 present two examples that illustrate dynamically encrypting packets after the detection of malware. Each of these examples is illustrated in three operational stages 1605-1615 or 1705-1715. In the example illustrated in FIG. 16, the messages sent from the infected GVM are encrypted, while in the example illustrated in FIG. 17, the messages sent from the other GVMs are encrypted.

The first stage 1605 in FIG. 16 shows the packets of the GVM 1650 on a host 1655 being sent out without being encrypted. The second stage 1610 then shows that the SVM 220 detects malware on GVM 1650. In response to this detection, the SVM identifies in its data store the GVM 1650 as being infected. Once the encryption agent notes this designation, it pushes an encryption rule into the data store 250 to designate that messages sent from GVM 1650 have to be encrypted. In some embodiments, this encryption rule is indexed based on one or more attributes of the GVM 1650 (e.g., its IP address, its MAC address, etc.).

The third stage 1615 then shows that because of this encryption rule, the encryptor 1607 encrypts the data messages sent from the GVM 1650. When a GVM is infected with malware, it is useful to have its outgoing messages encrypted in case the malware gathers data from the GVM and sends this data to undesired destinations.

In FIG. 17, the first two stages 1705 and 1710 are identical to the first two stages 1605 and 1610 of FIG. 16. However, in response to the malware detected in the second stage 1710 of FIG. 17, encryption policies that direct the behavior of the encryption agent in the event of an infected GVM, direct the encryption agent to push one or more encryption rules into the data store 250 to designate that messages sent from all uninfected GVM on the same host to be encrypted. In some embodiments, each such encryption rule is indexed based on one or more attributes of the uninfected GVMs.

The third stage 1715 of FIG. 17 then shows that because of the encryption rule(s), the encryptor 1707 encrypts the data messages sent from the GVM 1750 that is on the same host as the GVM 1650. When a GVM is infected with malware, it is useful to have messages sent from the other GVMs encrypted in case the malware tries to access the data of the uninfected GVMs through the share infrastructure (e.g., in the host memory or disk storage).

Figure 18:
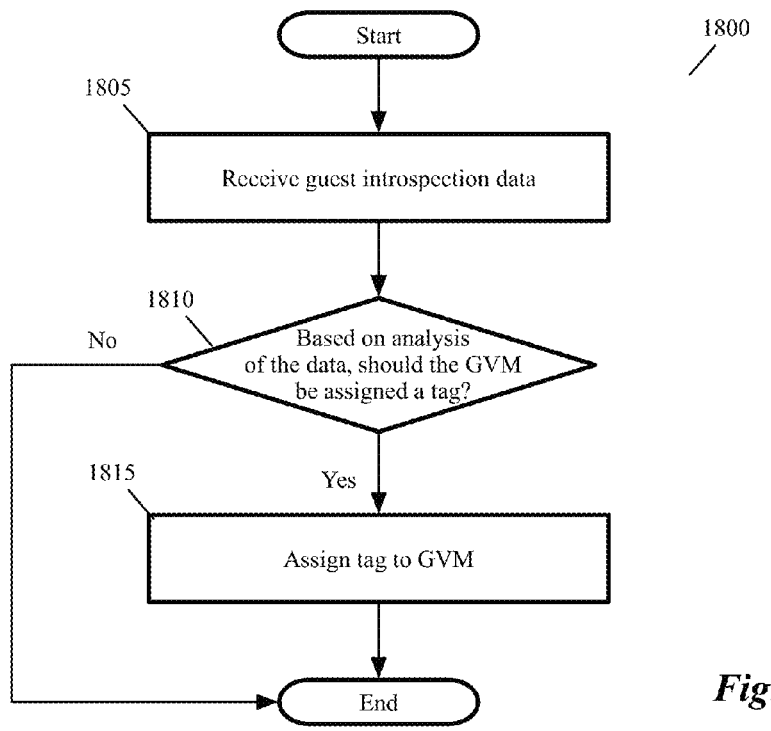
FIGS. 18 and 19 illustrate two processes that are employed in some embodiments to dynamically specify encryption rules for detected malware.
Figure 19:
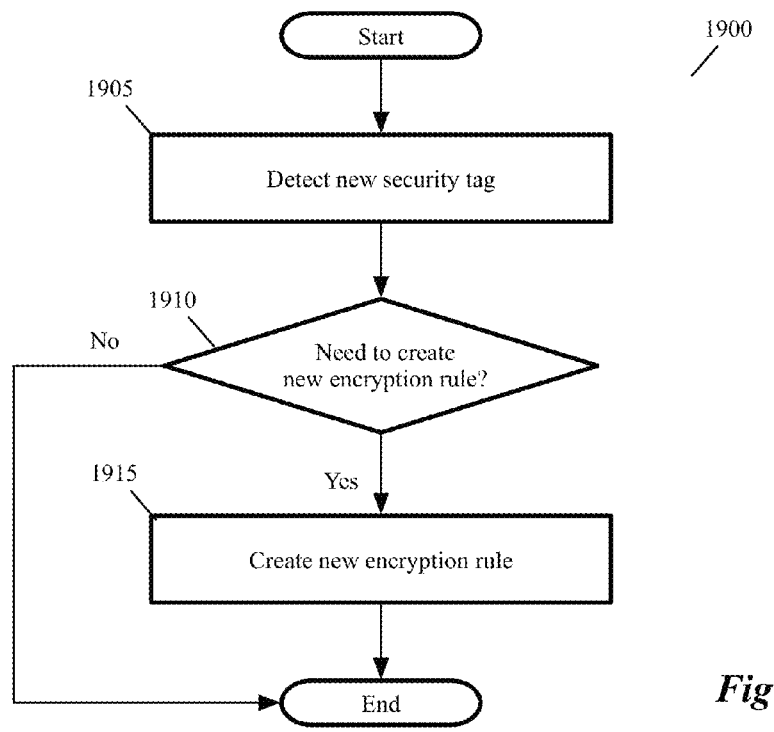

FIGS. 18 and 19 illustrate two processes 1800 and 1900 that are employed in some embodiments to dynamically specify encryption rules for detected malware. In some embodiments, the process 1800 is performed by the malware-detecting SVM 220. This SVM performs this process each time that it receives guest introspection data from a GI thin agent 430 (e.g., from the file and system introspectors 505 and 510) that is installed on a GVM. In some embodiments, the received GI data is in response to a query from the SVM 220. In other embodiments, the introspecting agent 430 periodically provides the GI data to the SVM 220.

As shown, this process 1800 starts (at 1805) when the SVM 220 receives the GI data from a thin agent 430 that is installed in a GVM. Next, the process determines (at 1810) whether the received GI data indicates that the GVM has been infected by malware. Any of the common anti-virus techniques that are used to detect the existence of malware can be used to perform the malware detection at 1810. In fact, the malware-detecting SVM 220 in some embodiments is a commercially available third-party SVM that scans GVMs in a hosted environment for malware. In some embodiments, examples of these third-party SVMs are SVMs that operate with the vShield Endpoint framework that is provided for the ESX hypervisor environment by VMware Inc.

When the received GI data does not indicate the existence of malware, the process 1800 ends. On the other hand, when the process determines (at 1810) that the received GI data indicates the existence of malware, the process assigns a malware tag to the GVM in the GVM-security designation data store 440, and then ends. In some embodiments, the process 1800 assigns one of several different security tags based on one of several different levels of potential security conditions that it detects based on its analysis of the received GI data. In some embodiments, some of these different security tags indicate different levels of confidence in the SVM's security assessment. In these or other embodiments, some of the different security tags indicate different detected security conditions.

The process 1900 of FIG. 19 conceptually illustrates a sequence of operations that the encryption agent processor 450 performs in some embodiments. The processor 450 performs this process each time that it detects a new security tag for a GVM that is executing on the processor's host. In some embodiments, the processor detects this tag when it is called by the malware-detecting SVM 220. In other embodiments, the processor 450 detects this tag because it gets a callback (for which the processor 450 previously registered) from the security designation data store 440. In still other embodiments, the processor 450 periodically scans the security designation data store 440 to identify security tags that have recently been added or modified for a GVM.

As shown, this process 1900 starts (at 1905) when the encryption agent processor 450 detects a new security tag for a particular GVM that is executing on the processor's host. Next, the process determines (at 1910) whether one or more encryption rules need to be specified to address the detected security condition on the particular GVM. To make this determination, the encryption agent processor 450 examines its encryption rule data store 425 to determine if it already contains the needed encryption rule(s), and if not, then it examines the encryption policies that it stores in its policy data store 456, in some embodiments. In other embodiments, the processor 450 makes the determination at 1910 by relaying the security tag to the virtualization controller set 320, and having the virtualization controller set determine whether one or more encryption rules need to be specified. In still other embodiments, the processor initially checks its own rule data store 425 and/or policy data stores 456 for a newly detected security tag, and only contacts the virtualization controller set for this tag when it does not have an encryption policy for this tag. In yet other embodiments, the processor only checks either the rule data store 425 or the policy data store 456 for a newly detected security tag. For instance, in some embodiments, the processor does not have an encryption policy data store 456 as encryption policies are not stored on the host. In some of these embodiments, the processor only checks (at 1910) its encryption rule data store 425 when a new security condition is detected.

Also, in some embodiments that employ multiple different security tags to specify multiple different security conditions, the encryption policies (of either the data store 456 or the virtualization controller set 320) may dictate GVM data message encryption for some of the security tags but not other security tags. This is because some of the security tags indicate security conditions that are severe enough to warrant the encryption of the GVM data messages, while other security tags do not.

When the process 1900 determines (at 1910) that it does not need to specify one or more encryption rules to address the newly detected security condition of the particular GVM, the process ends. On the other hand, when the process determines (at 1910) that it needs to specify one or more encryption rules, the process creates (at 1915) the encryption rule(s), stores (at 1915) the encryption rule(s) in its encryption rule data store 425, and then ends. From the encryption rule data store 425, any newly stored encryption rule gets published by the encryption rule publisher 454 to the encryption rule data store(s) 250 of any encryptor/decryptor that has to enforce the rule, as mentioned above.

Some embodiments encrypt the data messages of an infected GVM upon detecting its infection and/or encrypt the data messages of other GVMs on the same host as the infected GVM after detecting the infection. To encrypt data messages from the infected GVM, the process 1900 creates (at 1915) encryption rule(s) that direct the infected GVM's encryptor 215 to encrypt the GVM's data message. To encrypt data messages from the other GVMs on the same host as the infected GVM, the process 1900 creates (at 1915) encryption rule(s) that direct the encryptor(s) 215 of the other GVM(s) to encrypt the data messages from the GVM(s). As mentioned above, each generated encryption rule in some embodiments identifies its encryption process and/or its encryption key. Each encryption rule also has a rule identifier set 620 that contains one or more header values that uniquely identify the GVM with the data messages that have to be encrypted.

Figure 20:
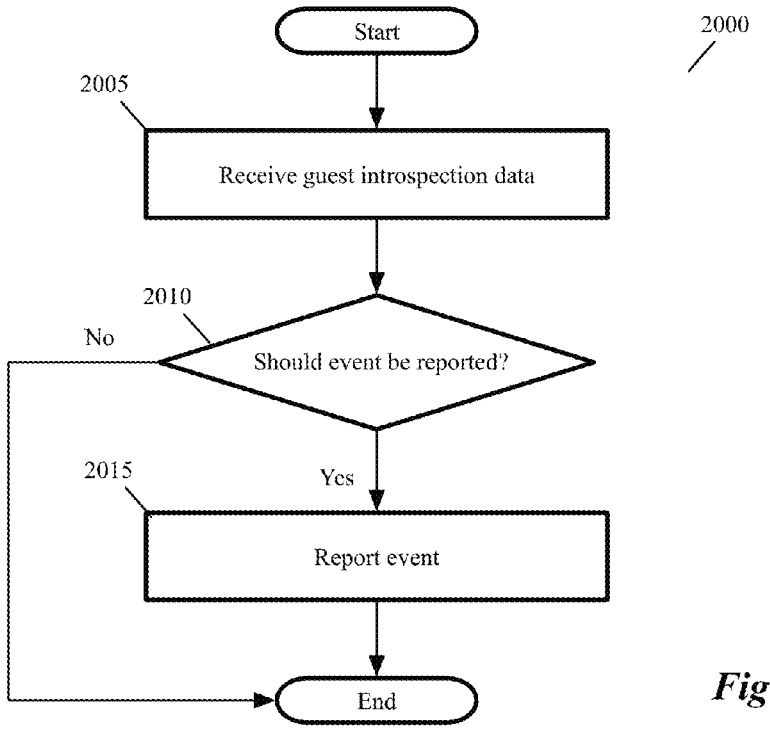
FIGS. 20 and 21 illustrate two processes that are employed in some embodiments to dynamically specify encryption rules for dynamically detected flow based events.
Figure 21:
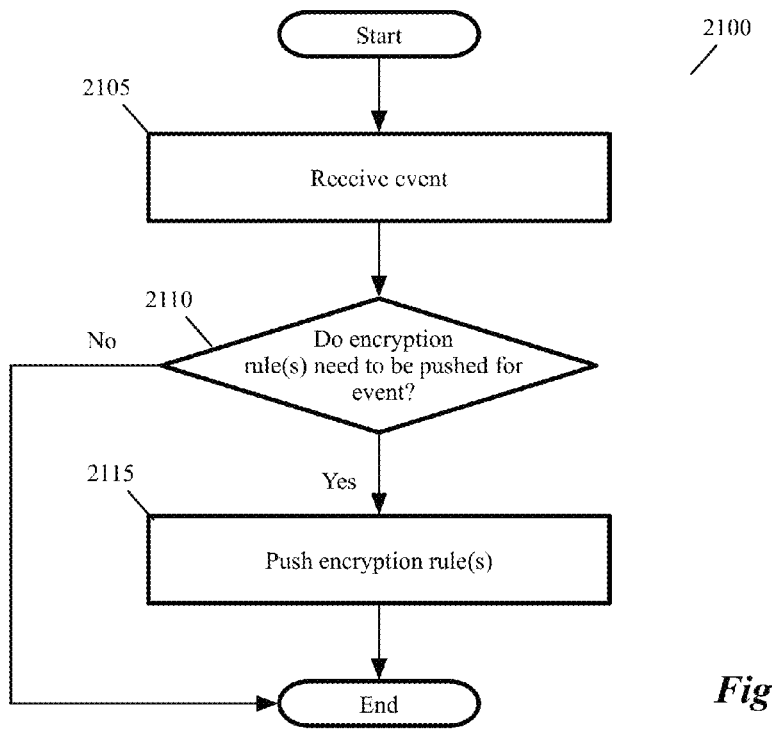

FIGS. 20 and 21 illustrate two processes 2000 and 2100 that are employed in some embodiments to dynamically specify encryption rules for dynamically detected flow based events. In some embodiments, the process 2000 is performed by the event-detecting SVM 465. As shown, the process 2000 starts (at 2005) each time that the SVM 465 receives guest introspection data from the network introspector 515 of the GI agent 430 that is installed on a GVM. As mentioned above, each time the GVM's TCP/IP stack initiates or terminates a connection request, the stack calls the network introspector 510. Through these calls, the network introspection module captures (1) every new connection request that is made by an application that is operating on the GVM, and (2) contextual information (e.g., user identity, application context, etc.) for the new connections.

The network introspector 515 provides the captured connection sessions and their associated contextual metadata to the flow-based event detecting SVM 465. In some embodiments, the SVM 465 then examines its configuration and cache stores to determine (at 2010) whether the captured event is an event for which it should provide a notification to the encryption agent 360, and if so, whether it has previously provided such a notification to the encryption agent 360.

When the SVM 465 determines that the received event data does not need to be reported, the process 2000 ends. On the other hand, when the SVM 465 determines that the received event data has to be reported, the SVM 465 notifies (at 2015) the encryption agent 360 of the received flow-based event and then ends. The agent then examines the encryption policies that it or the virtualization controller set 320 maintains to determine whether it or the virtualization controller set 320 needs to create and push encryption rule(s) to the encryption data store 250 to address the detected flow-based event. When encryption rule(s) are pushed, the encryptor set 215 then encrypts the data messages related to the detected flow-based event by using the key(s) specified in the rule(s).

The process 2100 of FIG. 21 conceptually illustrates the operation of the encryption agent processor 450 each time that the SVM 465 reports a new flow-based event. As shown, this process 2100 starts (at 2105) when the encryption agent processor 450 receives a new flow-based event from the SVM 465. Next, the process determines (at 2110) whether one or more encryption rules need to be specified to address the detected event for the particular GVM on which the flow-based event was detected. To make this determination, the encryption agent processor 450 examines its encryption rule data store 425 to determine if it already contains the needed encryption rule(s), and if not, then it examines the encryption policies that it stores in its policy data store 456, in some embodiments. In other embodiments, the processor 450 makes the determination at 2110 by relaying the event data to the virtualization controller set 320, and having the virtualization controller set determine whether one or more encryption rules need to be specified. In still other embodiments, the processor initially checks its own rule data store 425 and/or policy data stores 456 for a newly detected event, and only contacts the virtualization controller set for this event when it does not have an encryption policy for this event. In yet other embodiments, the processor only checks either the rule data store 425 or the policy data store 456 for a newly detected event.

When the process 2100 determines (at 2110) that it does not need to specify one or more encryption rules to address the newly detected event on the particular GVM, the process ends. On the other hand, when the process determines (at 2110) that it needs to specify one or more encryption rules, the process creates (at 2115) the encryption rule(s), stores (at 2115) the encryption rule(s) in its encryption rule data store 425, and then ends. From the encryption rule data store 425, any newly stored encryption rule gets published by the encryption rule publisher 454 to the encryption rule data store(s) 250 of any encryptor/decryptor that has to enforce the rule, as mentioned above. Each generated encryption rule in some embodiments identifies its encryption process and/or its encryption key. Each encryption rule also has a rule identifier set 620 that contains one or more header values that uniquely identify the flow (associated with the detected event) that has to be encrypted.

Figure 22:
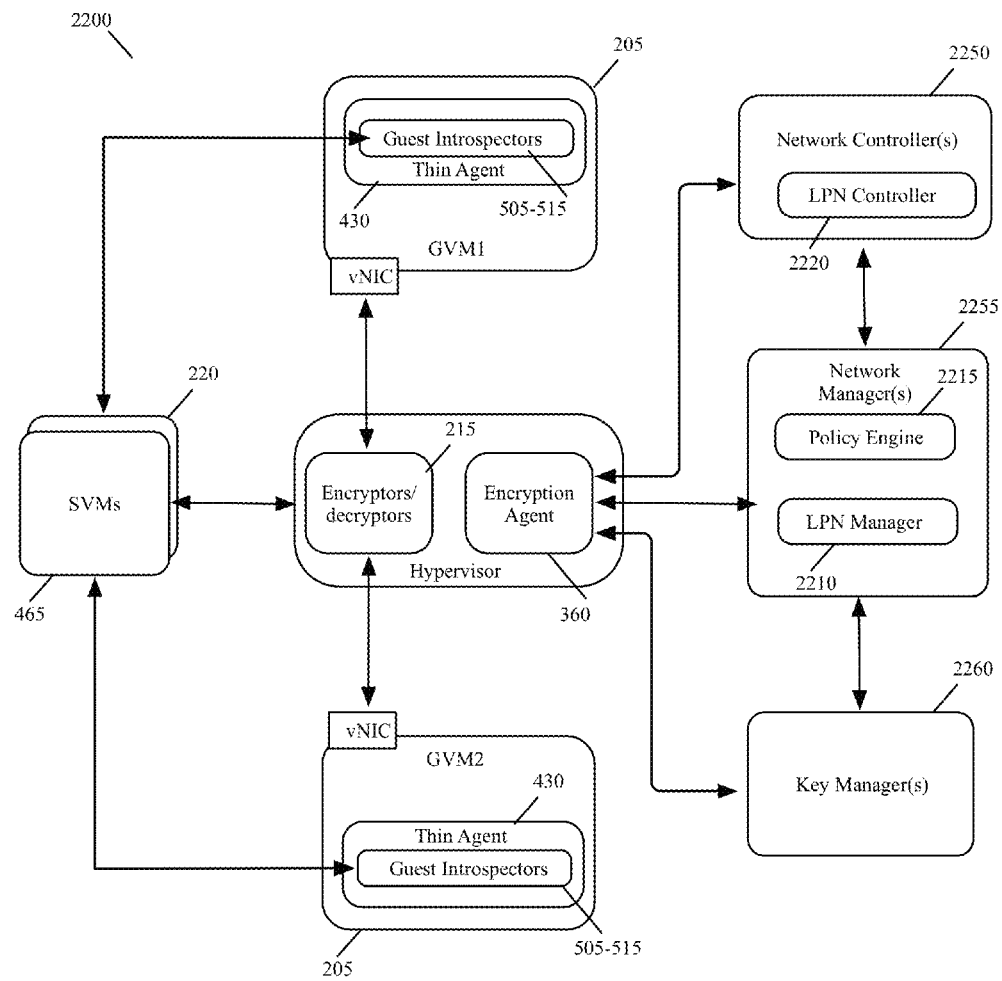
FIG. 22 presents a more-detailed diagram of an encryption system of some embodiments.

FIG. 22 presents a more-detailed diagram of an encryption system 2200 of some embodiments. In this system, the encryption agent 360 interacts with several servers and/or appliances that create the logical networks, manage the encryption operations within these networks, and manage the key distribution and key refresh operations for the encryption operations. As shown, these servers and/or application include a network controller set 2250, a network manager set 2255, and a key manager set 2260.

FIG. 22 also illustrates a context-aware, hypervisor-based encryption architecture 2200 that is similar to the architecture 402 of FIG. 4. Specifically, in each host, this architecture 2200 includes an encryption agent 360, an encryptor set 215, malware and event-detecting SVMs 220 and 465, and thin GI agent 430. The representation in FIG. 1 is slightly different than the representation in FIG. 4, in that in FIG. 1, the GVMs and SVMs are shown outside of the hypervisor 405, while in FIG. 4, these VMs are shown to operate on top of the hypervisor 405. Both representations are accurate as these VMs operate outside of the hypervisor in a software layer that is above the hypervisor. Also, in the architecture diagram in FIG. 1, some of the components (like the SFE 210, the SFE ports 230 and 235) are not shown, in order to simplify this figure.

The encryption architecture 2200 leverages guest introspection to identify security and non-security events to create context aware logical private networks. As described above by reference to FIGS. 4 and 5, guest introspection provides information about sensitive data, the applications and the users accessing them, and the timing and manner of the data flows in the network. This GI-enabled encryption architecture identifies the endpoints between which the network traffic needs to be secured, provides a way to isolate the traffic cryptographically, and protects the traffic from other machines that share the common network and compute infrastructure.

Guest introspection (e.g., its network introspector 515) provides connection data to the event-detecting SVM 465, which, in turn, relays this information to the encryption agent 360. Guest introspection (e.g., its file and systems introspectors 505 and 510) also provides file and system data to the malware-detecting SVM 220, which, in turn, defines the security posture of the GVMs. For a defined security posture (e.g., an infected machine), the encryption agent might supply the encryptor set 215 with one or more encryption rules that require this set to encrypt the data messages of the infected machine and/or of all the GVMs that operate on the same host as the infected machine.

In some embodiments, the security postures are provided through a hypervisor-based framework that allows SVMs from different vendors to gather GI data from the GVMs that operate on the hypervisor and provide security tags that define the security posture of these GVMs. Using the security tags applied on a GVM, a third-party SVM can provide information about what it detects on the GVM, in order to allow other security modules to take action with respect to the GVM. For instance, if an SVM's antivirus scan detects the presence of malware on GVM that the SVM is unable to clean, the SVM can tag the GVM as infected. A firewall agent or SVM that operates on the hypervisor, can then act on this tag and network-quarantine the infected GVM. Similarly, the encryption architecture can act on this tag to encrypt the messages of the infected machine and/or of all others GVMs on the same host.

The network controller set 2250 includes one or more controllers that define logical overlay networks in a multi-tenant environment in which multiple tenants share common compute (host) and network infrastructure in a datacenter. The logical networks can be thought of as networks connecting users and applications, isolated from the physical switches and routers. For applications, these networks can provide point-to-point connections. They can be L2, L3, or L4 networks with two or more endpoints.

By using fine-grained, encryption policies, these logical networks can be made into logical private networks (LPNs). Each LPN can have one or more micro-segments and each micro-segment can each be secured based on a specific security policy for that micro-segment. For instance, some embodiments encrypt connections between web servers and app servers of a logical network by using a first encryption key and a first encryption process, while encrypting connections between the app servers and database servers of the logical network by using a second encryption key and a second encryption process. Some of these embodiments identify the different encryption processes and different keys for the different network segments based on different header portions of the GVM data messages exchanged between the GVMs of these network segments. For example, some segments can be identified based on L2 and L3 parameters only, while other segments can be identified based on L4 parameters.

In some embodiments, the LPN are established by using Encapsulating Security Payload (ESP) frame format. ESP is a security encapsulation that provides privacy, integrity, non-repudiation and authenticity of the payload. ESP protocol contains a Security Parameters Index (SPI) field that can uniquely identify the security properties of the LPN (e.g., SPI identifies the encryption key for the destination of a GVM data message). ESP is widely used in IPSec inserted between IP and TCP/UDP. In some embodiments, ESP is inserted in appropriate layers to provide L2, L3 or L4 LPNs. ESP offload is supported by various NICs such as Intel Kawela and Intel Niantic.

In some embodiments, the ESP encapsulation uses encryption and authentication to provide data privacy, integrity and authenticity. For instance, in some embodiments, the ESP encapsulation uses AESGCM (Galois Counter Mode) in 128 bit or 256 bits, which provides both encryption and authentication, has better performance in contrast to the previous standard AES-128-CBC for encryption and SHAI-HMAC for authentication. In some embodiments, the ESP encapsulation not only encrypt the payload of the GVM message, but also encrypts a hash value that is generated from an integrity check value (ICV) calculations on the GVM message payload and on some or all of the unencrypted header value (e.g., L3/L4 header values, or logical network identifier values) of the GVM data message. After decrypting the payload along with the ICV-generated hash, the destination host can then authenticate the GVM data message by authenticating the hash value for the GVM data message's header value and payload.

In some embodiments, the logical overlay and security encapsulation (e.g., the ESP encapsulation) is performed by the encryptor set 215, which, as mentioned above, captures the traffic originating from a GVM. Through the LPN controller, the security policies and specifications (e.g., as encryption algorithm and key size) are provided by the LPN manager 2210 of the network manager 2255, while the encryption is done by the encryptor set 215. For VXLAN overlay network, the LPNs can secure L2 (e.g., the encryption rules are selected based on L2 parameters). For traffic between a web server and a database server, the LPNs can secure L4 (e.g., the encryption rules are selected at least partially based on L4 parameters). Accordingly, the encryptor set 215 in some embodiments captures the outbound traffic of the GVM, applies the appropriate security policy, and encrypts the traffic. For incoming traffic on the destination GVM, the encryptor set 215, in some embodiments, terminates the security overlay encapsulation.

In some embodiments, the encryptor set 215 is also responsible for authenticating the GVM VNICs with the LPN controller 2220 to restrict the member subscription into an LPN. In some embodiments, an encryptor/decryptor will be inserted for all VNICs on all the GVMs on each hypervisor. When the encryptor/decryptor is inserted on a VNIC, the encryptor/decryptor registers certain information (e.g., the VNIC information, VM identifier, host identifier, etc.) with the LPN controller 2220. The encryptor agent 360 in some embodiments is a user space daemon that acts on behalf of the encryptor set 215 to communicate with the LPN manager 2210, the network controller(s) 2250, and the key manager(s) 2260.

In some embodiments, an LPN controller 2220 in the network controller 2250 manages multiple LPNs in a datacenter. In some embodiments that use more than one network controller 2250, each network controller controls a different set of logical networks, and its LPN controller 2220 configures the encryption within the logical networks of its network controller 2250. The LPN controller 2220 is responsible for authenticating and providing configuration information to the encryptor set 215. When the key needs to be rotated for an LPN, the LPN controller ensures that all the encryptor sets 215 on all of the LPN's hosts are synchronized. The LPN controller 2220 distributes keys to the encryptor set if a key manager is not available (e.g., in a deployment that does not use a key manager appliance) or is not accessible by the encryption agent (e.g., because of firewall configurations, etc). When the key manager is not accessible, the LPN Manager in some embodiments fetches the keys and distributes them to the encryption agent through the LPN controller.

If required, the LPN controller can send kill commands to an encryptor set to destroy the key material, and sink all sensitive traffic. In some embodiments, the LPN controller sends the kill commands at the direction of the LPN manager 2210. When an LPN manager determines that a specific host has been compromised to a particular extent that would require its operations to be temporarily halted, the LPN Manager can send the kill command to that host's encryption agent 360 through the LPN controller 2220. Through this controller, the LPN manager also sends a kill command to a host, when the LPN manager determines that the compute cluster or the datacenter in which the host operates is under severe attack so as to not be trustworthy anymore. On receiving the kill command from the LPN controller, the encryption agent sets up a policy to sink all the network traffic, and propagates rules regarding the same to the encryptors 215. These rules cause the agent and/or encryptors to purge the keys that are being used, and cause the encryptors to drop the GVM data messages to prevent the network traffic from flowing.

The LPN manager 2210 collects the statistics from the host encryptor agents 360, which collects these statistics regularly from the encryptor sets 215 of the hosts. The LPN manager 2210 in some embodiments allows a security administrator to define security policies and specifications (e.g., as encryption algorithm and key size). The network manager includes a policy engine 2215 that assists the LPN manager 2210 with these operations. In some embodiments, the LPN manager 2210 offloads the management of the keys to the key manager(s) 2260 while it maintains the security credentials to access the keys. The LPN manager in some embodiments creates the keys required for an LPN on the designated key manager as per the defined security policies, but has the key manager set 2260 as the resource from which the host encryption agents pull the keys.

In some embodiments, the key life cycle management is performed by the LPN manager 2210. The key life cycle includes various states, which in some embodiments includes: pre-active, active, deactivated, compromised, destroyed, and destroyed compromised. These states are described in Management Interoperability Protocol Specification Version 1.2. Edited by Kiran Thota and Kelley Burgin, 9 Jan. 2014, OASIS Committee Specification Draft 01/Public Review Draft 01. This specification can be found at http://docs.oasis-open.org/kmip/spec/v1.2/kmip-spec-v1.2.html.

As further described below, the LPN manager 2210 creates a key ring with multiple active keys for an LPN (e.g., for one tenant in a multi-tenant datacenter). In some embodiments, the LPN manager 2210 is responsible for the key rotation operation that adds new active keys to an LPN's key ring or remove keys that need to be inactive from the LPN's key ring. In other embodiments, the key rotation responsibility is offloaded to the LPN controller 2220, as further described below. However, even in some of these embodiments, the LPN Manager will decide when to rotate the key but will offload the key rotation commands to the LPN Controller while passing it the key identifier(s).

While the key life cycle management is performed by the LPN manager 2210 in some embodiments, one of ordinary skill will realize that in other embodiments the key manager(s) 2260 perform this operation. The key manager set 2260 includes one or more key managers. In some embodiments, a key manager is an enterprise key manager (KM) appliance (e.g., a hardware appliance, or software module hardened for security), and it is responsible for storing and managing a large number of keys. When the encryption system 2200 is used in a multi-tenant datacenter, several different key managers provide key-management operations for several different tenants in the datacenter. In other words, each of several different tenants has their own unique set of one or more key managers that the tenant does not share with any other tenant. In some embodiments, however, one key manager might be shared between multiple tenants.

In some embodiments, a key manager specifies constructs and mechanisms to define groups of keys for manageability, and provides various security controls (e.g., access control and authentication) to access keys. In some embodiments, the authentication mechanisms include: public key infrastructure (PKI) certificates, username/password, and shared secrets. PKI is a type of key management system that uses hierarchical digital certificates to provide authentication and public keys to provide encryption. PKI binds public keys with respective identities by means of certificate authority (CA). The user identity is unique in each CA domain.

The key manager of some embodiments also enforces attestation of the requester to address the malicious requester threats. In some embodiments, the key managers use Key Management Interoperability Protocol (KMIP) interface as the communication protocol between key management systems and encryption systems. The key managers use this protocol for allowing the encryption controllers/managers to manage keys, to manage key life cycles, and to register clients. More information about the KMIP can be found in publicly distributed document, Key Management Interoperability Protocol Specification Version 1.2. Edited by Kiran Thota and Kelley Burgin, 9 Jan. 2014, OASIS Committee Specification Draft 01/Public Review Draft 01. This specification can be found at http://docs.oasis-open.org/kmip/spec/v1.2/kmip-spec-v1.2.html.

In some embodiments, the key manager set 2260 manages all the keys for one or more entities (e.g., tenants, companies, departments, etc.). Each key is identified by the universally unique identifier (UUID) generated by the key manager set 2260 when the key is created. The LPN controller 2220 associates an SPI with each key and informs the encryption agents 360 of the mapping information. The encryptor set has a set (or ring) of active SPIs—the ring size is small for smaller deployments and large for larger deployments. The ring size affects the latencies involved in coordinating a large number of endpoints within the LPN. For a ring of size 'r', keyring[0: r] has 'r+1' entries of which 'r' are active. Given the latest key, $key_n$, key rotation removes $key_{n+1}$ from the keyring and marks $key_{n+1}$ as the latest. In some embodiments, key rotation process entails the following three steps.

1. The LPN controller 2220 directs each encryption node (a) to prefetch $key_{n+1}$, the latest key from the key manager, and (b) to receive traffic with keys from keyring[o: r−1], but transmit using only keys from keyring[1: r−1] (i.e., without the key to be removed). All encryption nodes (where the encryptor nodes are the encryptors 215 that are associated with an LPN) send the LPN controller an acknowledge message. After the $key_{n+1}$ has been fetched, the nodes place the new key in keyring[r] slot.

2. The LPN controller 2220 tells each node to receive using keys from keyring[1: r], and confirm if $key_{n+1}$ has been fetched. At this stage, the nodes still transmit using keys from keyring[1: r−1]. All nodes send the LPN controller an acknowledge message.

3. The LPN Controller 2220 tells each node to transmit using keys from keyring[1: r]. All nodes remove the key from keyring[0]. All nodes send the LPN controller an acknowledge message, thereby confirming key rotation.

The above-described key rotation process provides a reliable mechanism for rotating to a new key in a system that suffers from delay in synchronizing the key switch over of multiple nodes. This delay can be substantial (e.g., many minutes or even into hours) when the number of nodes is very large. Thus, this mechanism provides a scheme for maintaining an old key as a viable key in the keyring for receiving traffic, until all the nodes can confirm receiving the new key that will take the place of the old key in the keyring.

At any time the goal is to have a single key that is considered good, but the keyring can include multiple other keys for an LPN to use. One benefit of having multiple potential keys is that the encryption system might have to changes keys at a rate faster than the rate that new keys can be added in a stable manner to the keyring for the LPN. For instance, the LPN key might have to be changed after 10 minutes (e.g., because a threshold amount of data, such as 1 terabytes of data, have been encrypted with the current key), but it might take 20 minutes to add a new key to the keyring because a very large number of nodes (e.g., at 1000 encryptor sets). Thus, having extra keys in the keyring would allow the LPN controller to direct the hosts to rotate to a new key in the keyring after the 10 minute period, even though it will take the LPN controller 20 minutes to add a new key to the keyring.

In some embodiments, the LPN controller directs all the LPN encryptors 215 to use a new key by sending them the SPI for the new key to use, where the SPI (1) identifies the key in the keyring of each node, and (2) identifies for the destination of an encrypted GVM data message the key that was used to encrypt the message. Alternatively, the LPN controller directs all the LPN encryptors to jump to the next key in their keyrings.

In some embodiments, the encryption architecture 2200 has several features and operations to ensure its security. First, in some embodiments, the guest agent integrity is ensured by a userworld process in the hypervisor. The userworld process checks that the guest agent has been loaded, code memory pages unmodified, and prevents attempts to tamper with the code, by leveraging APIs to read/write guest memory, installing memory traces for read/write/execute and accessing guest CPU registers and state.

Second, in some embodiments, the encryptor set 215 and encryption agent 360 are packaged together and installed on the hypervisor together. In some embodiments, a package integrity mechanism provides the software integrity guarantee and authenticity guarantee (they are signed packages). Third, through the encryption agent 360, the encryptor set 215 registers the VNIC identifier, the GVM identifier, the host identifier and other information with the LPN controller 2220 in some embodiments. The LPN manager 2210, in turn, confirms with the compute inventory to make sure that the GVM and VNIC are indeed running on the specified host. In some embodiments, the LPN manager 2210 also confirms the encryptor set 215 authenticity based on the host's certificate (e.g., host SSL certificate thumbprint).

Fourth, in some embodiments, the encryption agent 360 communicates with key manager set 2260, the LPN manager 2210 and the LPN controller 2220 by using client-server authentication processes (e.g., SSL/TLS processes). These processes authenticate the agent, manager(s) and controller, and encrypt messages between these authenticated modules.

Fifth, in some embodiments, the encryption agent 360 fetches the key from the key manager 2260 only when required. In some embodiments, the encryptor set 215 stores the key only in memory (e.g., in volatile memory, and not on disk) and periodically refreshes the key from the key manager as specified in the key-management policy. When the encryptor set is removed from a VNIC, the key in some embodiments is zeroed in memory and it unregisters with the LPN manager 2210. The encryptor set 215 is typically removed from a VNIC on a host when its associated GVM powers down or when the GVM migrates to another host.

Sixth, to prevent the traffic from cryptanalytic attacks, the keys are rotated in some embodiments. In some embodiments, the key rotation is performed periodically. In other embodiments, the key rotation is based on the amount of data that was encrypted by using a particular key (e.g., is rotated after a terabyte of data is encrypted with the current key). When the encryption-key usage that is collected by the LPN controller 2220 shows that the usage has exceeded a threshold amount, the LPN controller 2220 in some embodiments performs the key-rotation operation.

It should be noted that key rotation is different than refetching keys. Key rotation involves changing the encryption key for an LPN, while refetching is fetching the same key. As mentioned above, the LPN controller directs the encryptors 215 of an LPN to switch to a new key in their keyrings by providing the SPI for the new key to use, or by directing them to use the next key in their keyrings. The LPN controller might perform this action after noting that a threshold amount of data (e.g., 1 terabytes of data) has been encrypted with the current key.

On the other hand, a key is refetched in some embodiments when the encryption agent on the hypervisor is reloaded or is programmed to fetch the same key periodically (e.g., every day), so that the audit logs on the key manager show the continued usage of this key. This is because in some embodiments, when a VM powers down, the key is destroyed by encryption agent but the Key Manager is not informed that the key is no longer in use.

Figure 23:
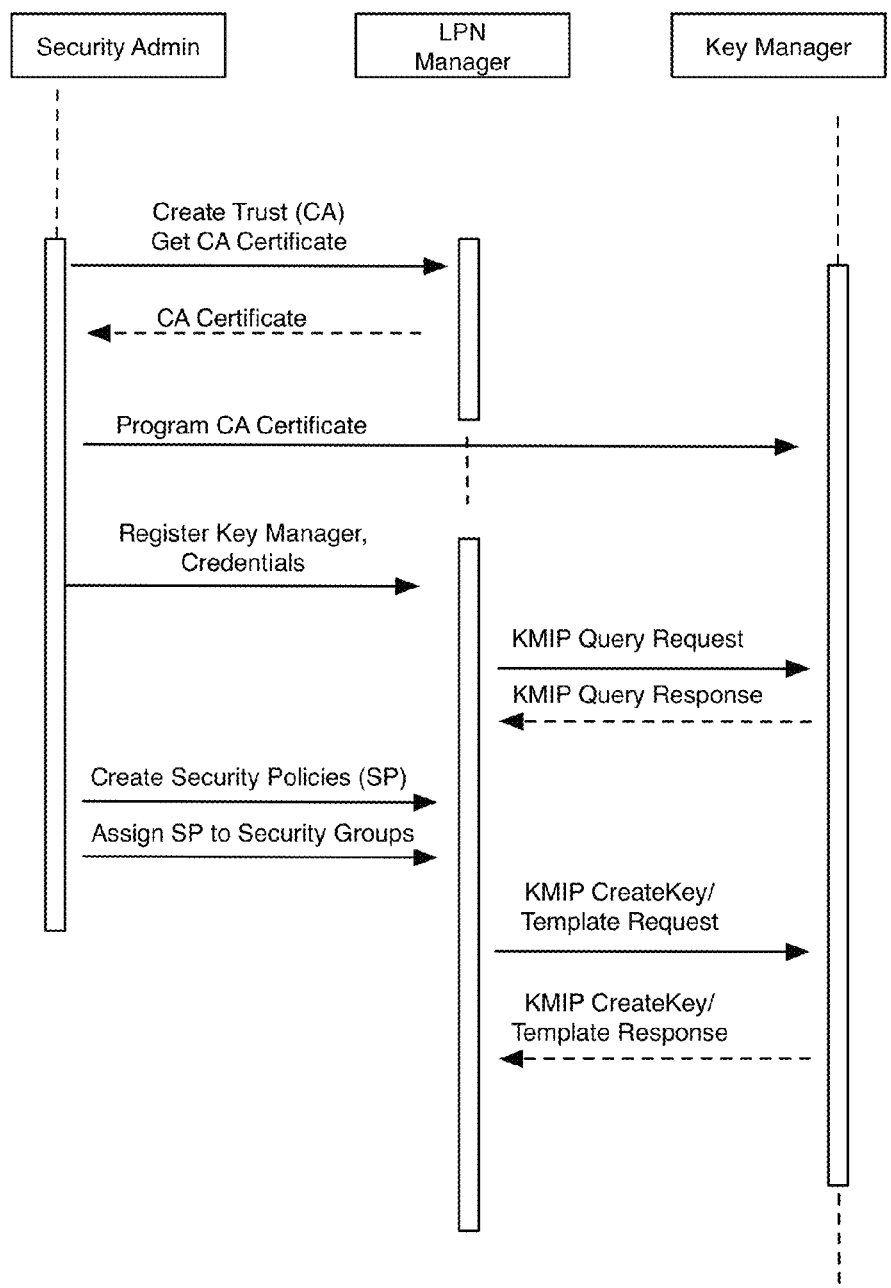
FIGS. 23-25 illustrate the workflow message exchange within the encryption system of some embodiments.
Figure 24:
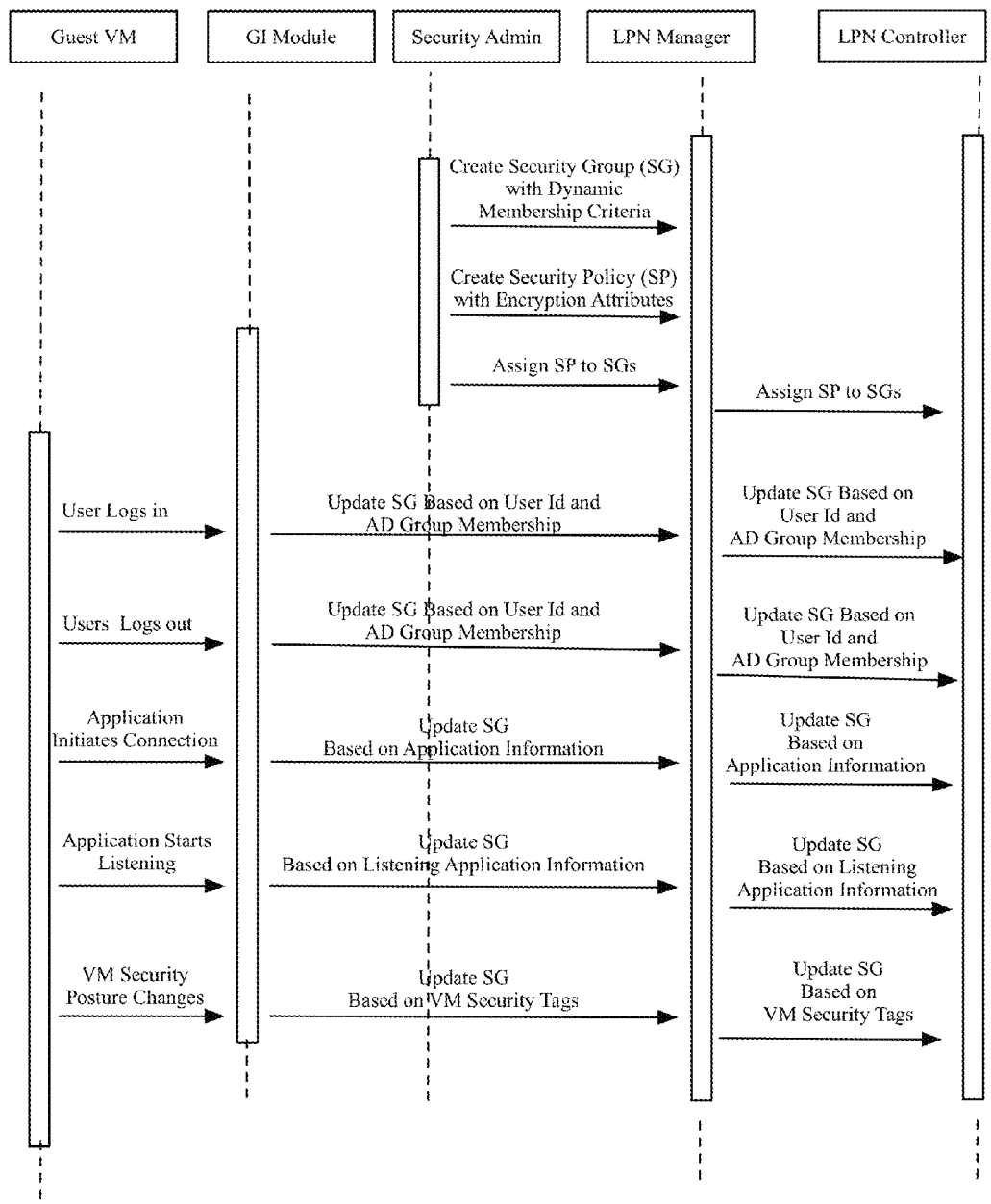
Figure 25:
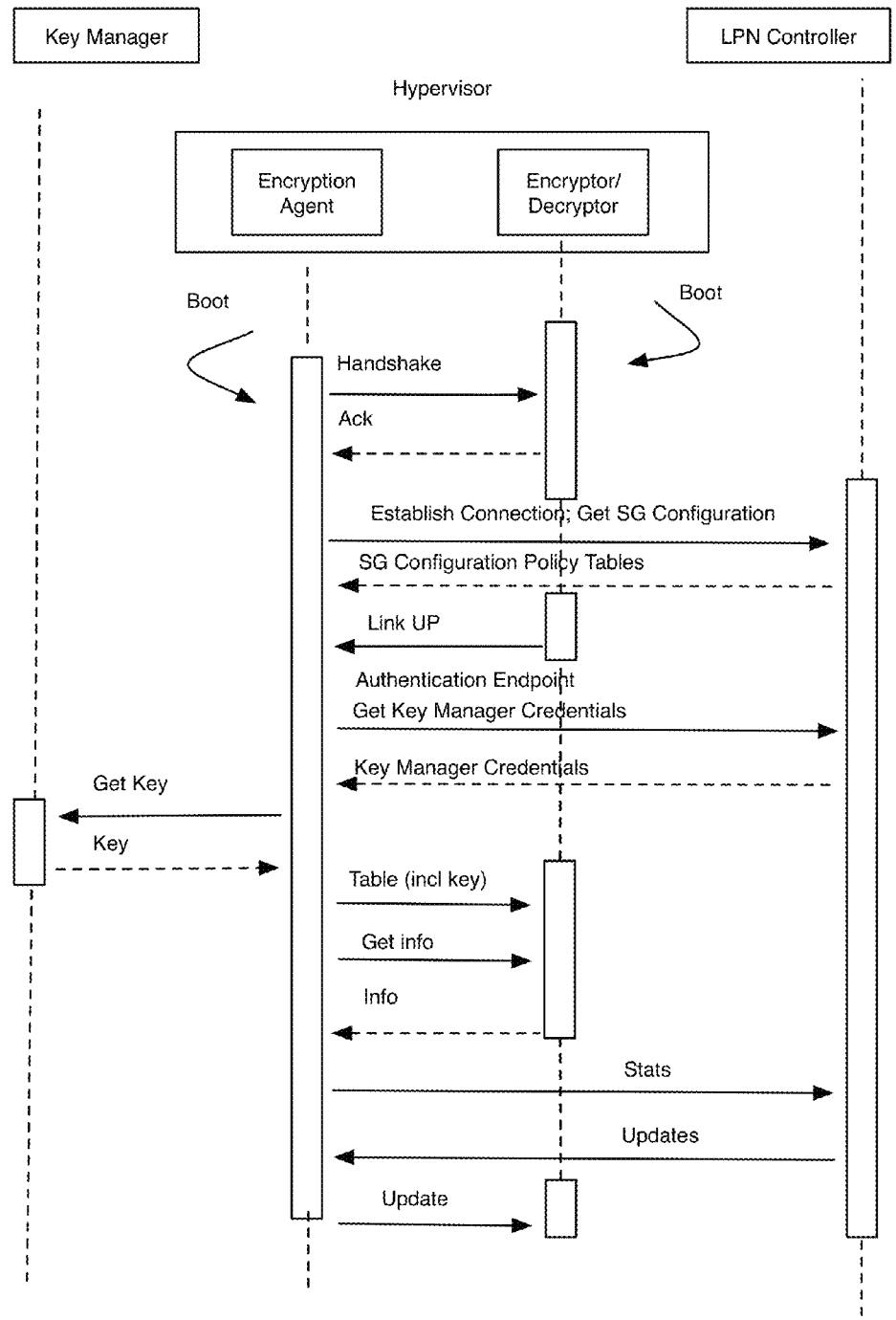

FIGS. 23-25 illustrate the workflow message exchange within the encryption system 2200 of some embodiments. FIG. 23 illustrates the messages exchanged between a security administrator, the LPN manager 2210 and the key manager set 2260 to create keys. In some embodiments, the security administrator interacts with the system (e.g., provides input and reviews output) through the user interface of the network manager 2255. Through this interface, the security administrator adds keys (as further described below by reference to FIG. 23), and defines security policies and security groups (as further described below by reference to FIGS. 23 and 24). The keys are created on the key managers by the LPN manager 2210 as required.

As shown in FIG. 23, the workflow starts with the security administrator incorporating a key manager in the network management system. This incorporation involves the pairing of the LPN manager 2210 with its associated key manager. When a tenant has multiple key mangers, this pairing has to be done between the LPN manager 2210 and multiple key managers 2260. FIG. 23 shows that the pairing process starts with the security administrator directing the LPN manager 2210 to generate a certificate authority (CA) for itself, and then registering this CA certificate with the key manager 2260. As part of this registration, the security administrator also obtains the key manager credentials (e.g., from the key manager after registering the LPN manager credentials with the key manager) and then registers these credentials with the LPN manager 2210. In some embodiments, the key manager credentials include one or more of the following key manager IP address, the key manager port to access, a public key infrastructure (PKI) certificate, username/password, shared secrets, etc., as mentioned above.

The LPN manager 2210 then sends a KMIP query request to its configured key manager to determine its capabilities and/or protocol mechanisms. In response to this query, the LPN manager 2210 obtains a KIMP query response that provides the requested information. As shown, once the LPN manager 2210 has the key manager capabilities, the security administrator can then direct the LPN manager to create security policies, and assign security policies to security groups. Through the KMIP interface, the LPN manager 2210 can then direct the key manager to create keys for the members of the security groups, as shown.

Security groups can be initially empty. In some embodiments, membership to the security groups can be statically or dynamically defined. Guest introspection allows grouping of GVMs into various security groups based on dynamically-changing attributes, such as user identity, application context, and/or security posture of the GVM. Examples of such security groups include: (1) GVMs with users logged on from the Finance group, (2) GVMs running Apache server, (3) GVMs containing malware, (4) GVMs running on hosts with a GVM that has malware, (5) GVMs containing sensitive HIPAA patient data, etc.

FIG. 24 illustrates the workflow messaging for security groups (SGs) with dynamic membership. As shown, a security administrator in some embodiments directs the LPN manager 2210 to create security groups with dynamic membership by initially creating security groups that have membership criteria that is based on dynamically-changing attributes. As shown, the administrator then directs the LPN manager 2210 (1) to create security policies with associated encryption policies and attributes, and (2) to assign the created security policies to the created security groups. Once the LPN manager 2210 receives the assignment of the security policies to the security groups, the LPN manager 2210 supplies the security groups, the security policies and their association to the LPN controller 2220.

As further shown, the following events in some embodiments trigger updates to the security membership depending on the attributes used to define the groups: (1) a user login/logout event, (2) an application initiating a connection, (3) an application listening on a particular port, and (4) a change in the security posture of a GVM (e.g., whether it is tagged as having malware, known vulnerable software, sensitive data, etc.).

FIG. 24 shows that each of these dynamic events is captured by a GI module on a GVM, and data regarding these events is relayed by the GI module to the LPN manager 2210 (e.g., through the encryption agent 360 and intervening SVM 220 or 465, which are not shown in this figure). When the dynamically detected event requires GVM messages to be encrypted, the encryption agent 360 then pushes rules to the LPN encryptor 215, or the LPN controller 2220 pushes this rule if the encryption agent does not already have encryption rules or encryption policies needed to address the needed encryption.

In other words, after detecting an event, the encryption agent 360 reports this event to the LPN manager 2210, and examines its encryption policy and rule data stores 456 and 425 to determine whether it has one or more encryption rules for the detected event. If so, it pushes this rule to the LPN encryptor 215. In response to the reported event, the LPN manager 2210 reports the event to the LPN controller 2220, which then determines whether it needs to push new encryption policies and/or rules to the encryption agent 360 to resolve the detected event. If so, the LPN controller 2220 pushes the encryption rules and/or policies to the agent 360, which then pushes one or more encryption rules to the LPN controller to address the detected event.

Once GVM is moved to a security group, the security policies, including the encryption policy, associated with that group are automatically applied to the traffic sent from and received for the GVM. When a GVM is powered on, the encryptor set 215 registers the VNIC with the LPN controller 2220 via the encryption agent 360. The LPN controller 2220 examines its data store to determine whether the GVM has been assigned a security policy based on its security group membership. If a security policy is found, the LPN controller 2220 passes the corresponding security group configuration and encryption policy information to the encryption agent, which then uses this information to push the correct encryption rules to the encryptor set's encryption rule data store 250 in order to allow the encryptor set 215 to enforce the security policy for this GVM. As mentioned above, the LPN controller 2220 provides updated configuration and encryption policy information to the encryption agent 360 when the security group membership dynamically changes.

FIG. 25 illustrates the workflow messaging that some embodiments use to encrypt or decrypt the GVM data messages. As shown, this workflow start initially when the encryptor 215 and the encryption agent 360 boot-up (e.g., when the host boots up) and engage in a handshake operation to validate their connection. Next, the encryption agent establishes a connection with the LPN controller 2220 to get security group configuration and policy tables.

When a GVM is booted-up or is migrated to this host, the encryptor is added to the chain of I/O operations for appropriate VNICs. The encryptor gathers the details from the VNIC and logical switch and send the LinkUP message to the encryption agent. The encryptor set 215 then asks the encryption agent 360 for key information when it receives a GVM message that is sent from the booted-up GVM to another GVM. In response, the encryption agent 360 asks the LPN controller to authenticate the endpoint (i.e., to authenticate the VNIC of the GVM), and provide key manager credentials and the lookup tables. Upon receiving key manager credentials and the lookup tables, the encryption agent 360 contacts the key manager specified by the LPN controller and obtains the needed key. The encryption agent then passes the requested key(s) to the encryptor set 215 (e.g., in a lookup table that includes the key(s)).

As shown, the encryption agent periodically or on-demand sends the encryptor set 215 with Get Info requests, in order to retrieve statistics from the encryptor set about its operation. The encryption agent then passes these statistics to the LPN controller, and based on these statistics, the LPN controller sends updates to the encryption agent, which relays these updates to the encryptor set 215. In some embodiments, the encryption agent periodically gathers statistics from the encryptor set and passes the statistics to the LPN controller, in order to allow this controller to start the dynamic key rotation operations, which were described above. In other words, the stat-gathering and update mechanism of FIG. 25 is used in some embodiments to rotate keys.

As mentioned above, the LPN manager 2210 also periodically or on-demand collects statistics that the encryption agent gathers from the encryptor set 215. The LPN manager 2210 uses these statistics to visually represent the health of the LPN to the administrator/user and the statistics can be displayed or provided as responses to REST APIs for various third party solutions which determine the network capacity, optimizations, etc. (e.g., to optimize performance by moving around GVMs). The LPN manager 2210 is the single point of interaction for the administrators to define LPNs, to check the health status (green/yellow/red), to provide any remediation, and to perform troubleshooting/debugging etc.

Two exemplary deployments of the context-aware network encryption of some embodiments will now be described. The first example involves a software-defined datacenter (SDDC) for a hospital. This datacenter has numerous users who may be part of different Active Directory groups, such as Doctors and Nurses. The datacenter also runs the hospital Epic servers that store confidential patient data. In this system, the administrator deploys security solutions to detect malware, vulnerable software, and sensitive HIPAA patient data on GVMs.

The hospital has the following example security policies:
1. Security Policy 1: Only Doctors and Nurses can access patient data on Epic servers. All such accesses must be via secure and encrypted channels.

2. Security Policy 2: Doctors' and Nurses' GVMs need to be scanned with an antivirus solution daily.

3. Security Policy 3: GVMs diagnosed with a virus or known malware risk level higher than "medium" must have all traffic dropped.

4. Security Policy 4: GVMs with confidential patient data on their disks that violates HIPAA policy must have all traffic encrypted.

5. Security Policy 5: All GVMs will be scanned for vulnerabilities weekly.

6. Security Policy 6: GVMs with vulnerabilities of CVSS score higher than 8 must have all incoming and outgoing traffic dropped.

In order to comply with the aforementioned security policies, the security administrator goes through the following process:

1. Create Security Group "Doctors" with dynamic membership criteria so that any GVM with a doctor logged on it becomes a member, and drops out of membership when the doctor logs out.

2. Create Security Group "Nurses" with dynamic membership criteria so that any GVM with a nurse logged on it becomes a member, and drops out of membership when the nurse logs off.

3. Create Security Group "Epic Servers" with dynamic membership criteria so that any GVM running Epic application, and listening on a particular port becomes a member.

4. Create Security Group "UnsecuredVMs" with dynamic membership criteria based on the security tag "HIPAA violation" on a GVM.

5. Create Security Group "Quarantine" with dynamic membership criteria based on the security tags "Vulnerable.CVSS>8", "MalwareFound. Medium", or "MalwareFound.High" on a GVM.

6. Create security policies for the following criteria, and choose an encryption scheme.
   (a) Doctors to Epic Servers: Encrypt
   (b) Nurses to Epic Servers: Encrypt
   (c) UnsecuredVMs to Any: Encrypt
   (d) Quarantine to Any: Drop 7. Assign the security policies to the security groups.

When an Epic application is initiated on a GVM, the GVM becomes part of the "Epic Servers" security group. When a doctor (or nurse) logs on to a GVM, it becomes a member of the "Doctors" ("Nurses") security group. When the doctor (or nurse) tries to access the Epic server, the appropriate security policy is enforced, and the traffic is encrypted as defined by the policy. Similarly, if a regular scan of the GVM detects HIPAA data on it, the GVM is automatically moved to the "UnsecuredVMs" SG, and all traffic to and from that GVM is encrypted. In this hospital system, attributes can be used to trigger context-aware network encryption in various scenarios. For instance, it can be extended to the granularity of a single connection, i.e., encryption decision can be made per connection based on the attributes of each individual connection (such as initiating application).

The second example involves an SDDC for an online shopping place, WonderDiapers.com. This datacenter uses a typical three-tier web application deployment that runs webservers (Web), application (App) servers and database (DB) servers. The database servers contain sensitive credit card information. The administrator deploys security solutions to detect malware, vulnerable software and the sensitive PCI data on these database GVMs.

This SDDC has the following mandated security policies in some embodiments:

1. Security Policy 1: Only the Database Administrator can access DB servers. All such accesses must be via secure and encrypted channels.

2. Security Policy 2: All GVMs need to be scanned with antivirus solution daily.

3. Security Policy 3: All GVMs will be scanned for vulnerabilities weekly.

4. Security Policy 4: GVMs with confidential PCI data on their disks that violates PCI policy must have all traffic encrypted.

5. Security Policy 5: GVMs diagnosed with a virus or known malware risk level higher than "medium" must have all outgoing traffic dropped.

6. Security Policy 6: GVMs with vulnerabilities of CVSS score higher than 8 must have all incoming and outgoing traffic dropped.

In order to comply with the aforementioned security policies, the security administrator goes through the following process:

1. Create Security Group "Web" with dynamic membership criteria so that any GVM that runs the Apache webserver application becomes a member.

2. Create Security Group "App" with dynamic membership criteria so that any GVM that runs data-processing applications becomes a member.

3. Create Security Group "DB" with dynamic membership criteria so that any VM that runs Oracle database becomes a member.

4. Create Security Group "DBAdmin" with dynamic membership criteria so that any GVM with a user that belongs to the Database Administrator Group logged in becomes a member, and drops out of membership when the administrator logs off.

5. Create Security Group "Quarantine" with dynamic membership criteria based on the security tags "Vulnerable.CVSS>8", "MalwareFound.Medium", or "MalwareFound.High" on a GVM.

6. Create security policies for the following criteria, and choose an encryption scheme.
   (a) Web Server to App Server: Encrypt
   (b) DBAdmin to DB Server: Encrypt
   (c) Not DBAdmin to DB Server: Drop
   (d) App Server to DB Server: Encrypt
   (e) Quarantine to Any: Drop 7. Assign the security policies to the security groups.

At initial deployment, the administrator deploys the Apache Webserver on several GVMs. Since the GVMs are running the Apache application, they become part of the Web Security Group. Similarly, the App and DB Security Groups are populated when the three-tier deployment is completed. At this point, all App to DB traffic is automatically encrypted due to the policies above. Similarly, all Web to App Security Group communication is encrypted. Also, apart from the Web Security Group members, the DB Security Group can only be accessed by a DB administrator. Any other user trying to access members of the DB Security Group will see that these requests are dropped.

At this point, normal operations are in progress. Assume now that the deployed version of Apache on one of the webservers has known vulnerabilities with CVSS scores greater than 8. When the vulnerability scan runs weekly, the vulnerability is detected, the GVM is tagged with the "Vulnerable.CVSS>8" tag. The particular Webserver is then moved to the Quarantine Security Group and it can no longer send or receive traffic. Similarly, assume that high-risk malware is detected on one of the Webservers. Again, this particular Webserver GVM is tagged with the "Malware- Found.High" tag and is automatically moved to the Quarantine Security Group and is cordoned off for all network access.

Figure 26:
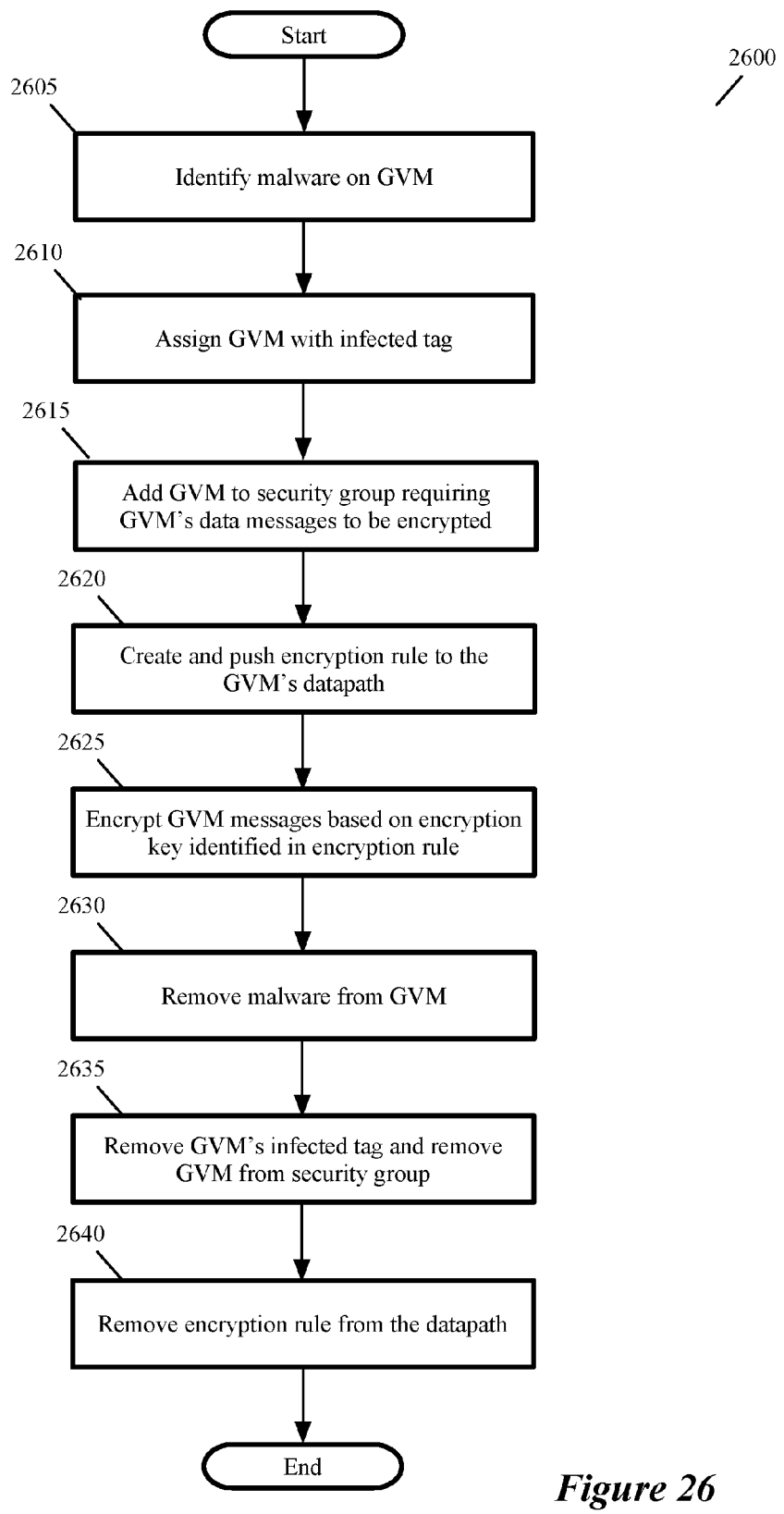
FIG. 26 illustrates a process for dynamically adding an infected GVM to a malware security group, and dynamically applying this' group's encryption rule to this GVM, until the malware has been resolved, at which time the GVM is dynamically removed from the security group.

To illustrate the dynamic addition of GVMs to security groups and the associated dynamic application of encryption rules to the security groups to the GVMs, two example processes will now be described by reference to FIGS. 26 and 27. FIG. 26 illustrates a process 2600 that various components of the encryption system 2200, of some embodiments, performs to dynamically add an infected GVM to a malware security group and to dynamically encrypt the data messages from this GVM based on the security group's encryption rule. After the malware infection has been resolved, this process dynamically removes the GVM from the malware security group, and stops encrypting its data messages as the group's encryption rule is no longer applicable to the GVM.

As shown, the process 2600 starts when the malware-detecting SVM 220 detects (at 2605) malware on a GVM executing on the SVM's host. Next, this SVM assigns (at 2610) an "infected" tag to the GVM in the security designation data store 440. Based on this designation, the encryption agent processor 450 has (at 2615) the GVM added to a malware-infected security group that this processor 450 or the LPN controller 2220 maintains. When the processor 450 maintains this security-group's membership, the processor in some embodiments adds the GVM's identifier to this membership and notifies the LPN controller 2220 to do the same. Otherwise, the processor in some embodiments directs the LPN controller 2220 to add the GVM's identifier to this group's membership.

Next, at 2620, the process 2600 creates an encryption rule that requires the encryption of the infected GVM's data messages, and then pushes this encryption rule to an encryptor along the infected GVM's datapath (e.g., pushes the encryption rule data store 250 of the encryptor 215 for the infected GVM). In some embodiments, the agent processor 450 pushes this rule by first resolving an encryption policy that it maintains, or sending the detected malware event to the LPN controller 2220, which either sends this agent an encryption policy to resolve or pushes an encryption rule to this agent after the controller resolved the policy. The policy that is being resolved either by the agent or the LPN controller is a policy that requires the encryption of the data messages sent by a malware infected GVM. After resolving this policy and generating an encryption rule for the malware infected GVM, the processor 450 stores the encryption rule in its rule data store 425, from where it is published to the encryption rule data store 250 of the infected GVM's encryptor 215.

Once this rule is stored in the data store 250, the infected-GVM's encryptor 215 encrypts (at 2625) the data messages from the infected GVM by using the encryption key that is identified in the encryption rule. As mentioned above, the encryption processor 450 (1) retrieves from the appropriate key manager 2260 the encryption keys for rules that it receives or creates, and (2) stores these keys in the key data store 420, from where the keys get published to the encryptor's key data store 415 by the publisher 454.

At some point, a system administrator removes (at 2630) the malware from the infected GVM. In response, the infected tag for this GVM is removed (at 2635) from the security designation data store 440 manually by the administrator or in an automated manner based on the malware-detecting SVM's assessment that the malware infection has been removed. Once the infected tag is removed, the GVM is removed (at 2635) from the malware-infected security group (by the processor 450 or the LPN controller 2220). Next, at 2640, the encryption rule that was created and pushed at 2620 is removed from the data stores 425 and 250. In some embodiments, the encryption agent processor 450 directs the removal of this rule from these data stores.

Figure 27:
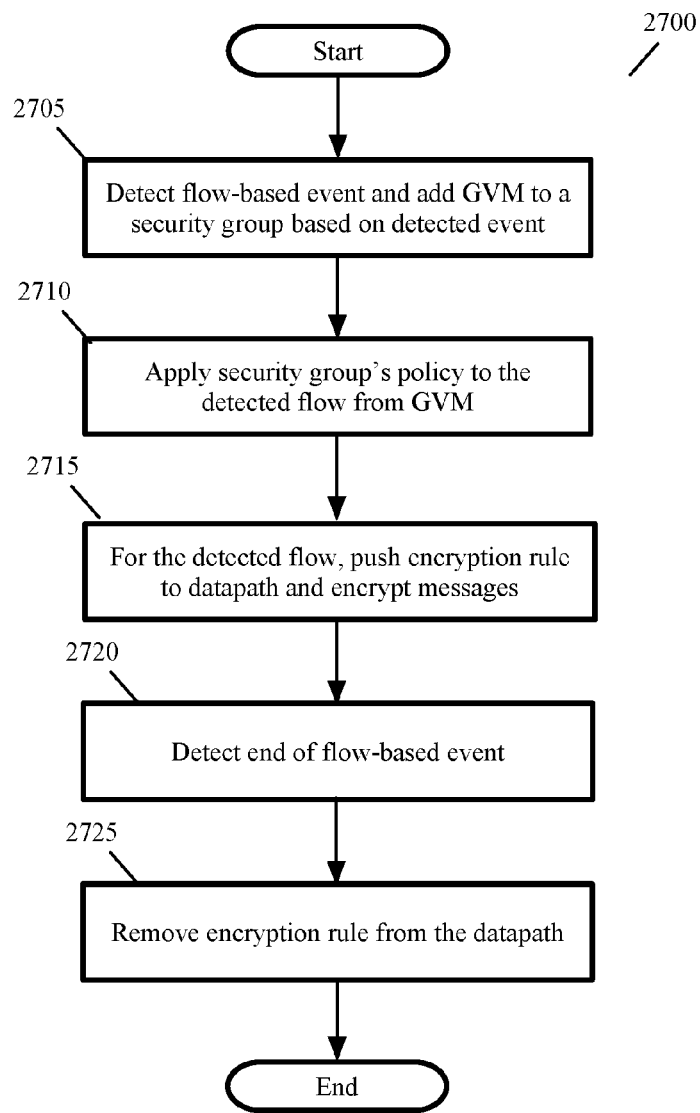
FIG. 27 illustrates a process for adding a GVM to a security group after a flow-based event is detected, and removing the GVM from the security group when the flow-based event is terminated.

FIG. 27 illustrates a process 2700 that various components of the encryption system 2200 of some embodiments perform to add a GVM to a security group after a flow-based event is detected, and to remove the GVM from the security group when the flow-based event is terminated. As shown, the process 2700 starts (at 2705) when the event-detecting SVM 465 receives guest introspection data from the network introspector 515 of the GI agent 430 that is installed on a GVM. The network introspector 515 of some embodiments provides the captured connection sessions and their associated contextual metadata to the flow-based event detecting SVM 465.

The SVM 465 then examines (at 2705) its configuration and determines that the captured event is an event for which it should provide a notification to the encryption agent processor 450. For instance, the detected event is a login event, and the captured contextual metadata might show that a doctor logged into a particular application. When the SVM 465 determines that the received event data has to be reported, the SVM 465 notifies the encryption agent processor 450 of the received flow-based event.

The processor 450 then examines (at 2705) the security groups that it or the LPN controller 2220 maintains, and determines (e.g., directly or indirectly through the LPN controller) that the detected flow needs to be added to a particular security group. For example, the particular security group might be for doctors who logon on to the particular application. Once the detected flow is added to a particular security group, the process 2700 applies (at 2710) the security policy of the security group to the detected flow. This application entails the encryption processor 450 or the LPN controller 2220 creating encryption rule(s) to address the detected flow-based event and pushing the encryption rule(s) to the processor's rule data store 425. From this data store, the encryption rule is published (at 2715) to the encryption rule data store 250 of the encryptor 215 of the GVM at which the flow-based event was detected. One example of such an encryption rule would be an encryption rule that specifies a particular encryption process and/or encryption key for encrypting messages that are sent for flows relating to a doctor's interaction with the particular application.

Once this rule is stored in the data store 250, the GVM's encryptor 215 encrypts (at 2715) the data messages from the GVM by using the encryption key that is identified in the encryption rule. As mentioned above, the encryption processor 450 (1) retrieves from the appropriate key manager 2260 the encryption keys for rules that it receives or creates, and (2) stores these keys in the key data store 420, from where the keys get published to the encryptor's key data store 415 by the publisher 454.

From the network introspector 515, the event-detecting SVM 465 at some point receives GI data that indicates the end of the detected flow based event. After detecting the end of the flow-based event (at 2720), the process 2700 removes (at 2725) the encryption rule from the data store 250 of the encryptor 215 of the GVM from which the flow emanated. In some embodiments, the encryption agent processor 450 directs the removal of this rule from these data stores. Along with the encryption rule, the process 2700 in some embodiments removes from the processor's policy data store the encryption policy as well, if one such policy was pushed by the LPN controller.

In the above-described processes (e.g., processes 2600 and 2700), encryption rules and/or policies are sent from the LPN controller 2220 to a host's encryption agent 360. One of ordinary skill will understand that in some embodiments, security group membership and/or membership updates are sent from the LPN controller 2220 to a host encryption agent 360. For instance, in some embodiments, the LPN controller 2220 sends to a host's encryption agent 360 a security group and an encryption policy that is applicable to the security group. The encryption policy requires a particular encryption for a first type of data flow (e.g., the policy requires encryption of data messages exchanged between two machines on which two medical practitioners (such as doctors and nurses) are logged).

When the LPN controller 2220 later determines that an initiated data flow on a particular GVM of the host is a first-type data flow (e.g., is a flow between a doctor that is using the GVM with a nurse on another host's GVM), the LPN controller 2220 in some embodiments adds the particular GVM to the security group, and notifies the host's encryption agent of the addition of this GVM as a member of the security group. Based on this updated membership, the encryption agent processor 450 generates an encryption rule for the encryptor of the particular GVM to use, when assessing whether the encryptor should encrypt first flow-type data messages from the particular GVM. When the LPN controller 2220 or encryption agent processor 450 later determines the end of the detected data flow, the particular GVM is removed from the security group, and based on this updated membership, the encryption rule that was previously provided to the encryptor is discarded, in some embodiments. In some embodiments, rules and/or policies are removed from their respective data stores after a period in which they do not get used.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 28:
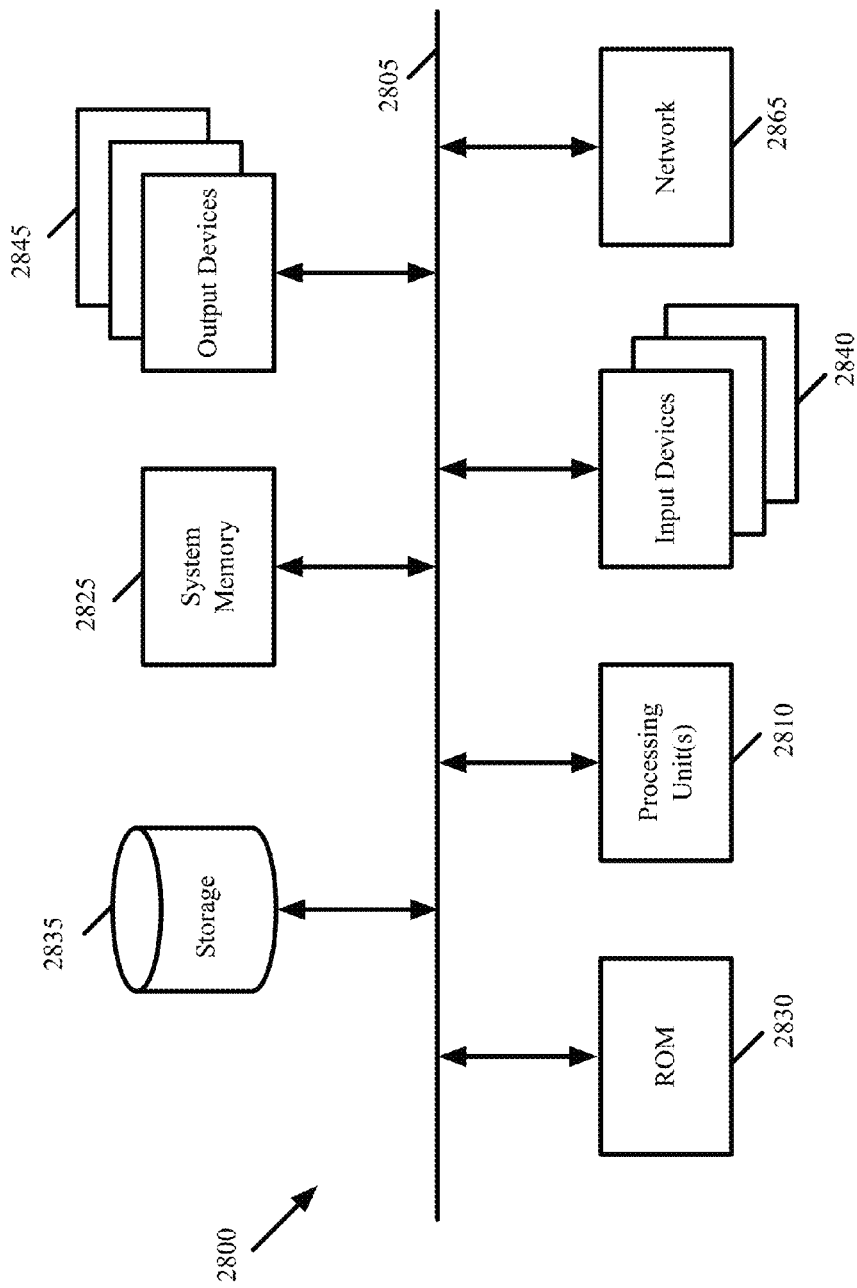
FIG. 28 illustrates a computer system that is used in some embodiments to implement a host computer, a controller computer or a manager computer.

FIG. 28 conceptually illustrates a computer system 2800 with which some embodiments of the invention are implemented. The computer system 2800 can be used to implement any of the above-described hosts, controllers, and managers. As such, it can be used to execute any of the above described processes. This computer system includes various types of non-transitory machine readable media and interfaces for various other types of machine readable media. Computer system 2800 includes a bus 2805, processing unit(s) 2810, a system memory 2825, a read-only memory 2830, a permanent storage device 2835, input devices 2840, and output devices 2845.

The bus 2805 collectively represents all system, peripheral, and chipset buses that communicatively connect the numerous internal devices of the computer system 2800. For instance, the bus 2805 communicatively connects the processing unit(s) 2810 with the read-only memory 2830, the system memory 2825, and the permanent storage device 2835.

From these various memory units, the processing unit(s) 2810 retrieve instructions to execute and data to process in order to execute the processes of the invention. The processing unit(s) may be a single processor or a multi-core processor in different embodiments. The read-only-memory (ROM) 2830 stores static data and instructions that are needed by the processing unit(s) 2810 and other modules of the computer system. The permanent storage device 2835, on the other hand, is a read-and-write memory device. This device is a non-volatile memory unit that stores instructions and data even when the computer system 2800 is off. Some embodiments of the invention use a mass-storage device (such as a magnetic or optical disk and its corresponding disk drive) as the permanent storage device 2835.

Other embodiments use a removable storage device (such as a floppy disk, flash drive, etc.) as the permanent storage device. Like the permanent storage device 2835, the system memory 2825 is a read-and-write memory device. However, unlike storage device 2835, the system memory is a volatile read-and-write memory, such a random access memory. The system memory stores some of the instructions and data that the processor needs at runtime. In some embodiments, the invention's processes are stored in the system memory 2825, the permanent storage device 2835, and/or the read-only memory 2830. From these various memory units, the processing unit(s) 2810 retrieve instructions to execute and data to process in order to execute the processes of some embodiments.

The bus 2805 also connects to the input and output devices 2840 and 2845. The input devices enable the user to communicate information and select commands to the computer system. The input devices 2840 include alphanumeric keyboards and pointing devices (also called "cursor control devices"). The output devices 2845 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 28, bus 2805 also couples computer system 2800 to a network 2865 through a network adapter (not shown). In this manner, the computer can be a part of a network of computers (such as a local area network ("LAN"), a wide area network ("WAN"), or an Intranet, or a network of networks, such as the Internet. Any or all components of computer system 2800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, while the encryption/decryption processes were described above by reference to the host architecture 200, 400, and 2200, one of ordinary skill will realize that these processes could be implemented in a variety of different architectures that capture and encrypt/decrypt GVM messages at variety of different locations along their egress path out of the host. For instance, in some embodiments, the encryption/decryption processes are implemented in the PNIC of the host. In other words, the PNIC of the host in some embodiments examines the GVM messages to determine whether it should encrypt/decrypting them before sending them out of the host or sending them to their destination GVMs. In some embodiments, the PNIC performs other functions such as defining logical networks (e.g., through the user of technologies such as SRIOV).

Also, a number of the figures (e.g., FIGS. 1, 8, 9, 10, 18, 19, 20, 21, 26 and 27) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Much of the discussion above relates to capturing and encrypting data messages sent from GVMs in a multi-VM hosted environment. However, one of ordinary skill will realize that the encryption architecture of some embodiments can be used to encrypt and decrypt data messages from any data end node (such as storage nodes, etc.). Accordingly, all of the above-described encryption architectures (such as the architectures of FIGS. 2, 4, and 22) and the above-described processes (e.g., of FIGS. 1, 8, 9, 10, 18, 19, 20, 21, 26 and 27) are equally applicable for encrypting and decrypting data messages from arbitrary data nodes in a virtualized environments. Also, the architecture of some embodiments can be used to provide other cryptographic services, such as signing messages for verification purposes, etc. In view of the foregoing, one of ordinary skill in the art would understand that the invention is not to be limited by the foregoing illustrative details, but rather is to be defined by the appended claims.

We claim:

1. For a host machine on which a set of virtual machines (VMs) execute, an encryption method comprising:
    detecting that a first VM in the set of VMs executing on the host machine is infected with malware by analyzing introspection data gathered from an agent installed on the first VM; and based on the detected malware infection, encrypting data messages transmitted by at least a second VM in the set of VMs executing on the host machine.

2. The method of claim 1, wherein before the malware was detected, the data messages from the second VM were not encrypted.

3. The method of claim 1, wherein the second VM is the first VM.

4. The method of claim 1, wherein encrypting data messages comprises encrypting data messages transmitted by a plurality of VMs in the set of VMs that execute on the host, said plurality of VMs including VMs that are not infected with malware.

5. The method of claim 1, wherein the second VM is not the first VM.

6. The method of claim 1, wherein detecting malware infection on the first VM comprises detecting that the first VM has been tagged as a malware-infected VM.

7. The method of claim 1 further comprising:
    examining a set of encryption policies to determine whether a set of encryption rules needs to be specified because the first VM has been detected with malware; and
    based on the examination of the encryption policy set, specifying at least one encryption rule that specifies that data messages transmitted by the second VM should be encrypted.

8. The method of claim 7, wherein specifying the encryption rule comprises specifying a plurality of encryption rules that each specify the encryption of data messages for a different VM in the set of VMs that executes on the host.

9. The method of claim 7, wherein the specified encryption rule specifies the encryption of data messages from a plurality of VMs that execute on the host, said plurality of VMs including at least one VM that is not infected with malware.

10. The method of claim 7, wherein the encryption policies are stored on the host computer.

11. The method of claim 1 further comprising:
inserting an encryption identifier in at least one encrypted data message, said encryption identifier for allowing a destination of the data message to decrypt the encrypted data message.

12. The method of claim 11, wherein the encryption identifier is a key identifier that identifies at least one of an encryption key that was used to encrypt the data message and a decryption key that is needed to decrypt the data message.

13. The method of claim 11, wherein the encryption identifier is an encryption identifier that identifies at least one of an encryption process that was used to encrypt the data message and a decryption process that is needed to decrypt the data message.

14. The method of claim 11, wherein the encryption identifier is inserted in a header field of the data message.

15. For a host machine on which a set of virtual machines (VMs) execute, an encryption method comprising:
detecting that a first VM in the set of VMs executing on the host machine is infected with malware by analyzing introspection data from a guest introspection agent installed on the first VM; and
based on the detected malware infection, encrypting data messages transmitted by at least a second VM in the set of VMs executing on the host machine.

16. A non-transitory machine readable medium storing a program for encrypting messages from a virtual machine (VM) in a set of VMs that execute on a host computer, the program comprising sets of instructions for: detecting that a first VM in the set of VMs executing on the host machine is infected with malware by analyzing introspection data gathered from an agent installed on the first VM; and based on the detected malware infection, encrypting data messages transmitted by at least a second VM in the set of VMs executing on the host machine.

17. The method of claim 15,
wherein the VMs are guest VMs (GVMs),
wherein detecting malware infection comprises determining whether a GVM has been associated with a malware tag by a service VM (SVM) executing on the host, and
wherein the SVM (i) analyzes introspection data provided by an agent installed on the GVM to determine whether the GVM has been infected with malware, and (ii) associates a malware tag with the GVM when the introspection data from the GVM indicates that the GVM has been infected by malware.

18. The non-transitory machine readable medium of claim 16, wherein the set of instructions for encrypting data messages comprises sets of instructions for:
using a set of message attribute values to identify one encryption rule from a plurality of stored encryption rules, said identified encryption rule being an encryption rule that is defined for the data messages sent by the second VM;
retrieving an encryption parameter for an encryption process from the identified encryption rule; and
using the identified encryption parameter to encrypt the data messages.

19. The non-transitory machine readable medium of claim 16, wherein the set of VMs includes VMs belonging to different tenants.

20. The non-transitory machine readable medium of claim 16, wherein the set of instructions for encrypting data messages comprises a set of instructions for encrypting data messages from a plurality of VMs that execute on the host, said plurality of VMs belonging to a plurality of tenants, said plurality of VMs further comprising VMs that are not infected with malware.

21. The non-transitory machine readable medium of claim 16 further comprising sets of instructions for:
examining a set of encryption policies to determine whether a set of encryption rules needs to be specified because the first VM has been detected with malware; and
based on the examination of the encryption policy set, specifying at least one encryption rule that specifies that data messages transmitted by the second VM should be encrypted.

22. The non-transitory machine readable medium of claim 16,
wherein the VMs are guest VMs (GVMs),
wherein the set of instructions for detecting malware infection further comprises a set of instructions for determining whether a GVM has been associated with a malware tag by a service VM (SVM) executing on the host, and
wherein the SVM (i) analyzes introspection data provided by an agent installed on the GVM to determine whether the GVM has been infected with malware, and (ii) associates a malware tag with the GVM when the introspection data from the GVM indicates that the GVM has been infected by malware.

23. The non-transitory machine readable medium of claim 16 further comprising a set of instructions for inserting an encryption identifier in at least one encrypted data message, said encryption identifier for allowing a destination of the data message to decrypt the encrypted data message.

24. A non-transitory machine readable medium storing a program for encrypting messages from a virtual machine (VM) in a set of VMs that execute on a host computer, the program comprising sets of instructions for:
detecting that a first VM in the set of VMs executing on the host machine is infected with malware by analyzing introspection data from a guest introspection agent installed on the VM; and
based on the detected malware infection, encrypting data messages transmitted by at least a second VM in the set of VMs executing on the host machine.

* * * * *